(12) United States Patent
Mckearin et al.

(10) Patent No.: US 12,387,533 B2
(45) Date of Patent: Aug. 12, 2025

(54) SYSTEM AND METHOD FOR VEHICLE DIAGNOSTICS

(71) Applicant: HERE Global B.V., Eindhoven (NL)

(72) Inventors: John J. Mckearin, Berwyn, IL (US); Ion C. Moraru, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 371 days.

(21) Appl. No.: 17/966,517

(22) Filed: Oct. 14, 2022

(65) Prior Publication Data

US 2024/0127632 A1  Apr. 18, 2024

(51) Int. Cl.
*G07C 5/08* (2006.01)
*G06N 20/00* (2019.01)
*G07C 5/00* (2006.01)

(52) U.S. Cl.
CPC ............ *G07C 5/006* (2013.01); *G06N 20/00* (2019.01); *G07C 5/0808* (2013.01); *G07C 5/0816* (2013.01)

(58) Field of Classification Search
CPC ............ B60W 50/14; B60W 2556/45; B60W 2422/95; B60W 2420/403; B60W 50/0205
See application file for complete search history.

(56) References Cited

U.S. PATENT DOCUMENTS

| | | | |
|---|---|---|---|
| 6,294,989 B1 * | 9/2001 | Schofield | B60R 1/12 |
| | | | 340/442 |
| 9,487,142 B2 * | 11/2016 | Sobecki | B60R 1/06 |
| 9,648,256 B2 * | 5/2017 | Ramsey | H04N 23/11 |
| 10,699,404 B1 * | 6/2020 | Nussbaum | G06T 7/50 |
| 10,791,265 B1 * | 9/2020 | Lambert | G06V 10/24 |
| 10,949,814 B1 * | 3/2021 | Nelson | G06Q 10/20 |
| 11,557,211 B2 * | 1/2023 | Chow | H04N 23/69 |
| 11,608,010 B1 * | 3/2023 | Harris | B60R 11/04 |
| 11,703,457 B2 * | 7/2023 | Yang | G01S 17/42 |
| | | | 348/125 |
| 2008/0136625 A1 * | 6/2008 | Chew | G01V 5/20 |
| | | | 340/540 |
| 2008/0292211 A1 * | 11/2008 | Frantz | G01N 21/8806 |
| | | | 382/284 |
| 2016/0243988 A1 * | 8/2016 | Peterson | B60R 1/0617 |
| 2017/0068756 A1 * | 3/2017 | Wilsher | G06F 30/20 |
| 2017/0210282 A1 * | 7/2017 | Rodriguez Barros | B60Q 1/324 |
| 2017/0210297 A1 * | 7/2017 | Kim | G01S 17/931 |
| 2018/0222391 A1 | 8/2018 | Chen | |
| 2019/0154803 A1 * | 5/2019 | Eichenholz | G02B 26/101 |

(Continued)

FOREIGN PATENT DOCUMENTS

CN  105235453 A  1/2016
KR  101270602 B1  6/2013

(Continued)

*Primary Examiner* — Dino Kujundzic

(57) ABSTRACT

An approach for vehicle diagnostics is provided. The approach, for example, involves receiving an indication identifying a need for a diagnostic scan. The approach also involves executing the diagnostic scan by initiating a movement of a movable sensor of a vehicle mirror assembly attached to a vehicle and acquiring diagnostic data during the movement of the movable sensor. The approach further involves analyzing the diagnostic data to generate a diagnostic report and providing the diagnostic report as an output.

20 Claims, 14 Drawing Sheets

(56) References Cited

U.S. PATENT DOCUMENTS

| | | | | |
|---|---|---|---|---|
| 2019/0279447 | A1* | 9/2019 | Ricci | G06F 3/017 |
| 2020/0156592 | A1* | 5/2020 | Zaharia | B60R 25/104 |
| 2020/0191951 | A1* | 6/2020 | Reilly | G01S 13/931 |
| 2020/0275004 | A1* | 8/2020 | Condron | H04N 23/61 |
| 2020/0331496 | A1* | 10/2020 | Cao | G01S 17/931 |
| 2020/0353877 | A1* | 11/2020 | Kong | H04N 23/60 |
| 2021/0092331 | A1* | 3/2021 | Terauchi | B60R 1/074 |
| 2021/0136188 | A1* | 5/2021 | Lei | H04N 23/60 |
| 2021/0326603 | A1* | 10/2021 | Kempf | G06V 10/147 |
| 2022/0027823 | A1* | 1/2022 | Singh | G06Q 10/10 |
| 2022/0101661 | A1* | 3/2022 | Wildemann | G01S 19/01 |
| 2022/0222805 | A1* | 7/2022 | Levin | H04N 13/296 |
| 2022/0250245 | A1* | 8/2022 | Panigrahi | G01M 17/007 |
| 2022/0324383 | A1* | 10/2022 | Silva | B60R 11/04 |
| 2023/0070720 | A1* | 3/2023 | Wilson, II | G06Q 40/08 |
| 2023/0083504 | A1* | 3/2023 | Burns | B60R 25/305 |
| | | | | 705/4 |
| 2024/0034109 | A1* | 2/2024 | Whinnery | B60C 23/064 |
| 2024/0247976 | A1* | 7/2024 | Silva | G06Q 10/00 |
| 2024/0272280 | A1* | 8/2024 | Adams | B08B 5/02 |

FOREIGN PATENT DOCUMENTS

| | | |
|---|---|---|
| KR | 20200086497 A | 7/2020 |
| WO | 2019031799 A1 | 2/2019 |

\* cited by examiner

SYSTEM AND METHOD FOR VEHICLE DIAGNOSTICS

BACKGROUND

Regular vehicle inspection is generally needed to keep vehicles in good operating order. While modern vehicles have increasingly sophisticated self-diagnostic and monitoring systems, such systems traditionally have not extended to inspections to external areas of the vehicle such as but not limited to the vehicle's body, wheels, and/tires. Historically, users have had to manually inspect these areas for wear, damage, and/or other potential problems. Accordingly, service providers and manufacturers face significant technical challenges with respect to extending automated vehicle diagnostics to all areas of a vehicle.

SOME EXAMPLE EMBODIMENTS

Therefore, there is a need for improved vehicle diagnostics, e.g., particularly for external areas such as a vehicle's body, wheels, tires, and/or other areas not served by conventional diagnostic and/or monitoring systems.

According to one embodiment, a method comprises receiving an indication identifying a need for a diagnostic scan. The method also comprises executing the diagnostic scan by initiating a movement of a movable sensor of a vehicle mirror assembly attached to a vehicle and acquiring diagnostic data during the movement of the movable sensor. The method further comprises analyzing the diagnostic data to generate a diagnostic report and providing the report as an output.

According to another embodiment, a system comprises one or more movable sensors of a vehicle. The system also comprises a controller for directing a movement of the one or more movable sensors. The system further comprises at least one processor configured to receive an indication identifying a need for a diagnostic scan, execute the diagnostic scan by initiating the movement of the one or more movable sensors and acquiring diagnostic data during the movement of the one or more movable sensors, and analyze the diagnostic data to generate a diagnostic report.

According to another embodiment, an apparatus comprises at least one processor, and at least one memory including computer program code for one or more computer programs, the at least one memory and the computer program code configured to, with the at least one processor, cause, at least in part, the apparatus to receive an indication identifying a need for a diagnostic scan. The apparatus is also caused to execute the diagnostic scan by initiating a movement of a movable sensor of a vehicle mirror assembly attached to a vehicle and acquiring diagnostic data during the movement of the movable sensor. The apparatus is further caused to analyze the diagnostic data to generate a diagnostic report and provide the report as an output.

According to another embodiment, a computer-readable storage medium carries one or more sequences of one or more instructions which, when executed by one or more processors, cause, at least in part, an apparatus to receive an indication identifying a need for a diagnostic scan. The apparatus is also caused to execute the diagnostic scan by initiating a movement of a movable sensor of a vehicle mirror assembly attached to a vehicle and acquiring diagnostic data during the movement of the movable sensor. The apparatus is further caused to analyze the diagnostic data to generate a diagnostic report and provide the report as an output.

According to another embodiment, an apparatus comprises means for receiving an indication identifying a need for a diagnostic scan. The apparatus also comprises means for executing the diagnostic scan by initiating a movement of a movable sensor of a vehicle mirror assembly attached to a vehicle and acquiring diagnostic data during the movement of the movable sensor. The apparatus further comprises means for analyzing the diagnostic data to generate a diagnostic report and for providing the report as an output.

In addition, for various example embodiments described herein, the following is applicable: a computer program product may be provided. For example, a computer program product comprising instructions which, when the program is executed by a computer, cause the computer to perform any one or any combination of methods (or processes) disclosed.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

Embodiments described herein refer to sensors associated with a vehicle. It is contemplated that embodiments of the invention also apply to other equipment components associated with a vehicle. Such other equipment components may include communications hardware, such as antennae or arrays, data ports, display ports, vehicle tags, displays, lighting, mirrors, tires, windshield wipers, brakes, windshield washers and the like.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of an apparatus, method, and computer program for providing a vehicle mirror assembly with movable sensor are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such, "one embodiment" can also be used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Figure 1:
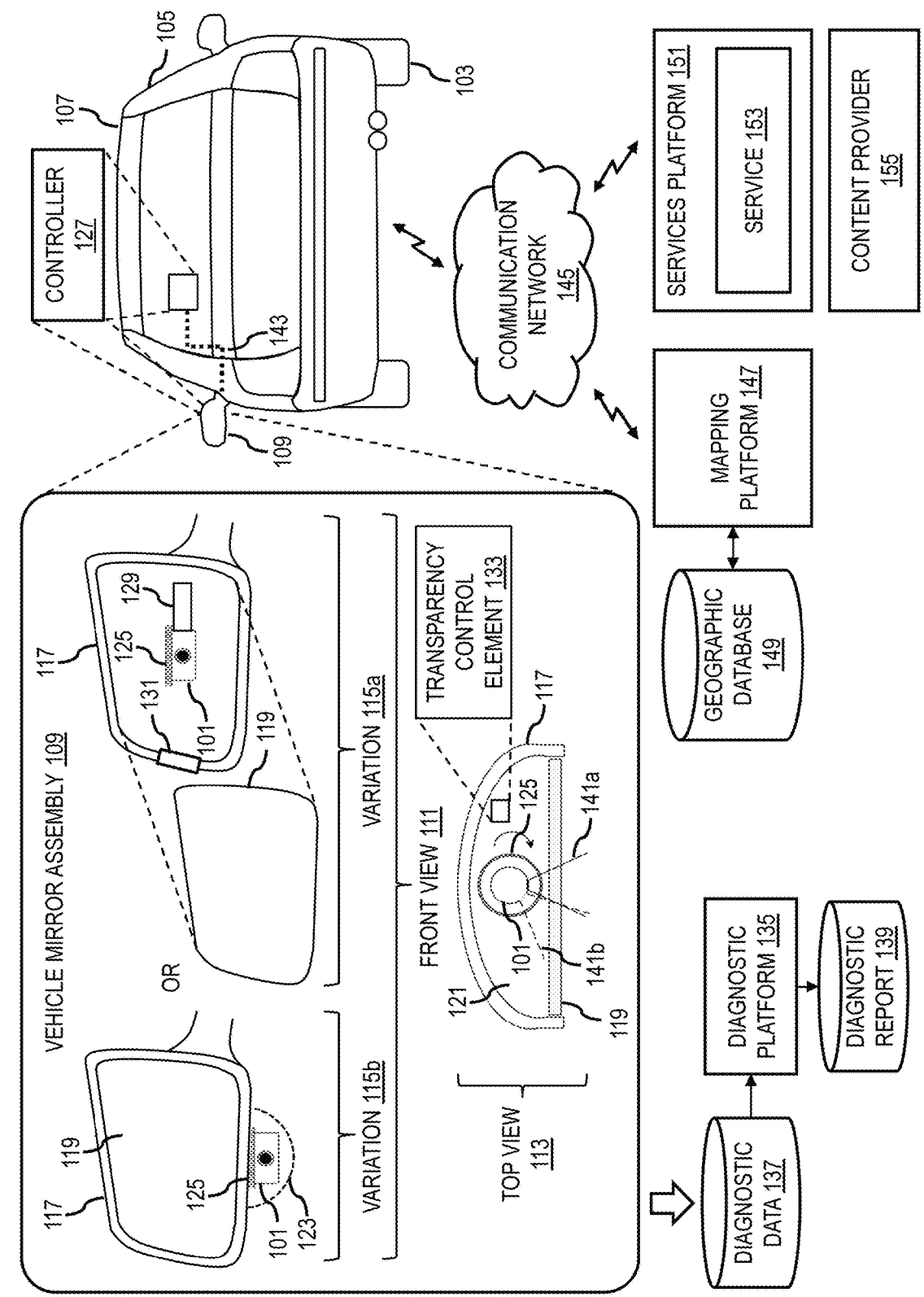
FIG. 1 is a diagram of system capable vehicle diagnostics based on a movable sensor, according to one example embodiment.

FIG. 1 is a diagram of system 100 capable vehicle diagnostics based on a movable sensor 101, according to one example embodiment. Proper tire (e.g., tire 103) and vehicle body (e.g., body 105) condition ensures safe and efficient operation of a vehicle 107. Yet, drivers often neglect or ignore the condition of their vehicles 107, which then leads to operation inefficiencies (e.g., excessive gas consumption due to low tire pressure, reduced aerodynamics from damaged vehicle bodies 105, etc.) or catastrophic failures (e.g., tire blowouts, corrosion, etc.). This is particularly relevant when non-catastrophic problems or imperceptible changes occur (e.g., slow tire leaks/wear, sub-surface structural body defects, corrosion, etc.). Hence, there is a need for preventing such inefficiencies and failures to safeguard road safety and reduce costly repairs/replacements. This need is particularly important for vehicles 107 that are autonomous, which may not have drivers that pay attention to the vehicle 107. This is because vehicle tire 103/body 105 inspections are typically done manually by mechanics, and often as a result of other vehicle troubles. Although there are some conventional sensors that can detect low tire pressure, significant technical challenges remain with respect to providing self-diagnosing technologies that can assess the condition of vehicle tires/body.

To address these technical challenges, the system 100 of FIG. 1 introduces a capability to provide a self-diagnosing approach to detect vehicle tire/body issues using movable sensors 101 incorporated into a vehicle mirror assembly 109. It is noted that although the various example embodiments described herein are discussed with respect to vehicle tire/body issues, it is contemplated that the various embodiments are also applicable to any other vehicle condition detectable from sensor or diagnostic data. In one embodiment, the approach of the various embodiments described herein capitalize on a vehicle mirror assembly 109 with movable sensors 101 that can be controlled to perform a diagnostic scan on features of the vehicle 107 to identify vehicle condition and/or related potential issues (e.g., issues with the vehicle tires 103 and/or body 105). The movable sensor 101 provides the capability to see parts of the vehicle 107, tires 103, and/or body 105, as well as the surrounding environment (e.g., by increasing its field of view) that may otherwise not be visible using a fixed sensor at the same location. This enables the system 100 to use fewer movable sensors 101 to fill gaps in sensor coverage left by traditional fixed sensors. In other words, to provide the same coverage or field of view, more traditional fixed sensors would have to be used or the available fixed sensors would have gaps in their diagnostic scans. Such gaps can present high risks, particularly for autonomous driving applications. Although more cameras/sensors can be used to fill the gaps, the use of additional sensors could have an impact on cost, space, and/or resources of the vehicle 107.

FIG. 1 illustrates in part the vehicle mirror assembly 109 from a front view 111 and a top view 113 with the top view 113 having a first variation 115a and a second variation 115b (the variations 115a and 115b are described in more detail further below). As shown in FIG. 1, in one embodiment, the vehicle mirror assembly 109 may include:

- a housing 117 attachable to a vehicle 107 (e.g., as a driver-side or passenger-side mirror);
- a reflective surface 119 coupled to/covering an opening in the housing 117;
- a movable sensor 101 contained inside a space 121 formed by the housing 117 and reflective surface 119 (e.g., variation 115a) or attached externally to the housing 117 with an optional cover 123 (e.g., variation 115b);
- an actuator assembly 125 configured to modify an orientation/position of the movable sensor 101 in response to control signals (e.g., sent from a controller 127);
- an optional telescoping arm 129 (or any equivalent means of extension) to which the movable sensor 101 is fixed and is configured to extend the movable sensor 101 outside of the vehicle mirror assembly 109 through a portal 131 (e.g., can be automatically opened or closed by the controller 127 as needed) in the housing 117 to provide a more versatile field of view than available from fixed mounted movable sensor 101; and
- a transparency control element 133 configured to selectively control the opacity/transparency of the housing 117 and/or reflective surface 119 by application of voltage, heat, light, etc. depending on the material of the housing 117 and/or reflective surface 119 to enable signals emitted or measured by the movable sensor 101 to pass through.

In one embodiment, a diagnostic platform 135 (e.g., a local or cloud component) alone or in combination with the controller 127 can instruct the movable sensor 101 of the vehicle mirror assembly 109 to perform a diagnostic scan of the vehicle 107. During the diagnostic scan, the movable sensor 101 is signaled to perform a controlled sweep of (or otherwise signaled to direct its field of view to) an area of the vehicle 107 to be scanned (e.g., tires 103 and/or body 105). During the diagnostic scan, the diagnostic platform 135 collects the sensor data captured by the movable sensor 101 as diagnostic data 137. This diagnostic data 137 is analyzed (e.g., using predictive and/or feature detection machine learning models or algorithms) to generate a diagnostic report 139 about the condition of the area of interest on the vehicle 107.

Figure 2:
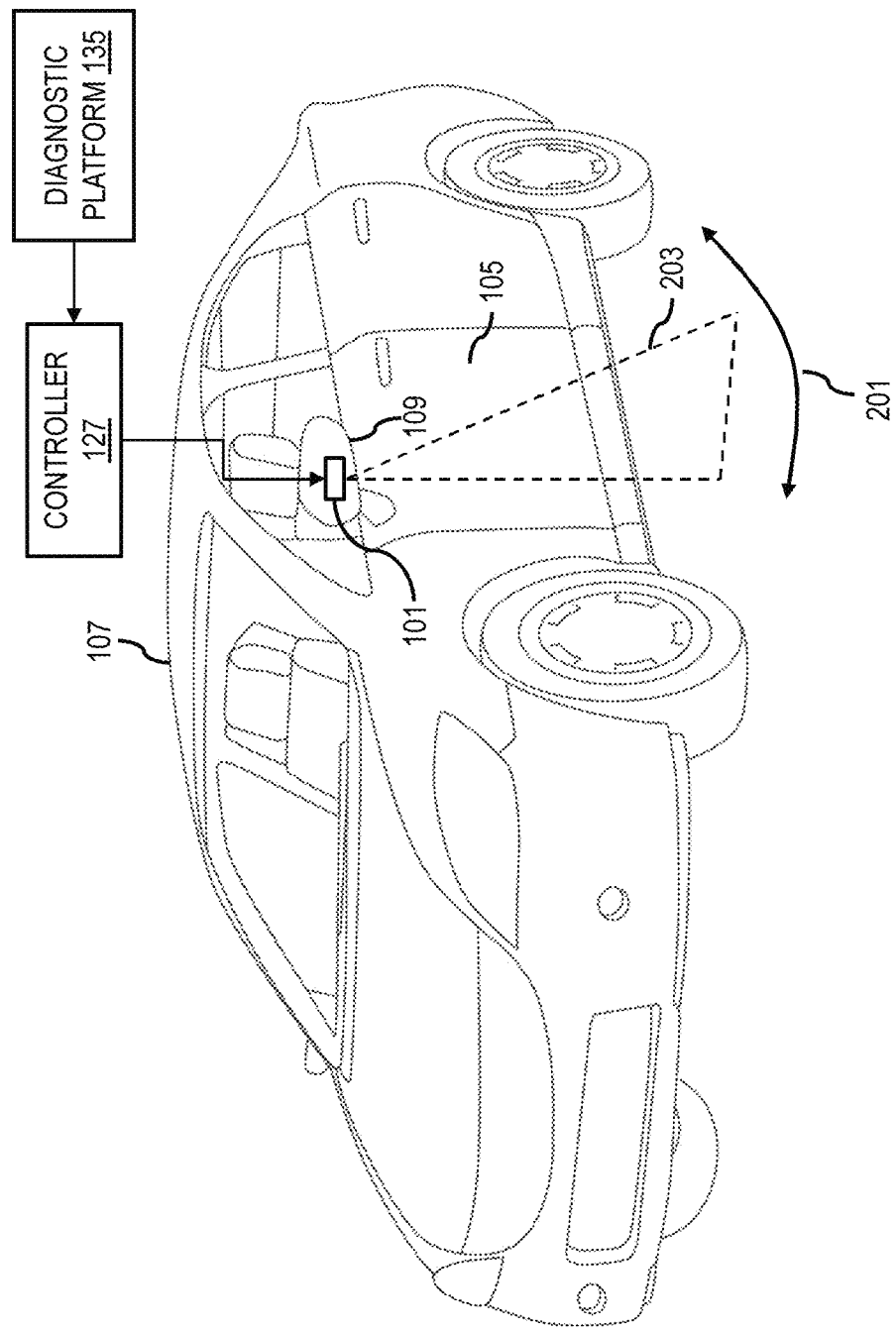
FIG. 2 is a diagram illustrating an example of movable sensor used for vehicle diagnostics to perform as diagnostic scan on a vehicle body, according to one example embodiment.

FIG. 2 is a diagram illustrating an example of a movable sensor 101 used for vehicle diagnostics, according to one example embodiment. As shown, the vehicle 107 is equipped with a vehicle mirror assembly 109 including a movable sensor 101. The diagnostic platform 135 initiates a diagnostic scan by instructing the controller 127 to actuate the movable sensor 101 to perform a sweep 201 that directs the field of view 203 over the vehicle body 105 (e.g., to scan the vehicle body 105 for damage). In this example, the movable sensor 101 is a camera configured to capture image data. Sensor data (e.g., image data) from the movable sensor 101 is collected as the sweep 119 is performed so that images of the vehicle body 105 is captured. The image data can then be analyzed, e.g., using computer vision and machine learning based feature detection, to identify damage to the vehicle body 105 (e.g., by analyzing the image data to determine the presence of scratches, dents, rust, and/or any other signs of damage).

The vehicle diagnostic approach described herein based on movable sensors 101 provides a number of advantages, including but not limited to the ability to avoid inefficient, costly, or catastrophic issues stemming from vehicle tire/body problems. In one embodiment, the system 100 provides a self-diagnosing approach that can inform/alert users of issues with a vehicle 107's tires 103 and/or body 105 (or any other vehicle condition) detectable from the diagnostic data 137 collected from movable sensors 101 during a diagnostic scan enabled by the vehicle mirror assembly 109.

There are many use cases for the various embodiments described herein including but not limited to:
- Safety/wear checks for manual, semi-autonomous, and/or autonomous vehicles 107;
- Safety/wear checks for vehicle providers (e.g., rental companies, vehicle dealers, fleet owners, etc.); and
- Remote monitoring of vehicles 107 in public places (e.g., places associated with high risk of damage).

The various embodiments described herein also offer advantages including but not limited to:
- Able to detect imminent/catastrophic events and quantify their risks; and
- Able to detect imperceptible tire/body changes (which would inform drivers for needed service or allow companies to estimate/predict tire usage/fuel usage).

In one embodiment, the unique capabilities of the vehicle mirror assembly 109 enable the various embodiments of vehicle diagnostics described herein. For example, the reflective surface 119 can be partially or semi-transparent, or a one-way mirror such that light or other target signal wavelengths can pass through the reflective surface 119 (e.g., from and/or to the movable sensor 101 mounted in the space 121 of the vehicle mirror assembly 109). The reflective surface 119 may include a reflective coating (e.g. a metallic coating). In other embodiments, the reflective surface 119 may include a layer/coating whose opacity/transparency can be controlled by voltage (e.g., electrochromic), heat (e.g., thermochromic), or light (e.g., photochromic). By way of example, the layer/coating can include but is not limited to: (1) electrochromic devices such as electrochromic glass that changes its opacity in response to voltage; (2) polymer-dispersed liquid-crystal devices in which liquid crystals are randomly dispersed into a polymer such that the polymer appears translucent or more opaque and then appears transparent when a voltage is applied to align the liquid crystals in the polymer; (3) suspended-particle devices in which nano-particles are suspended in a liquid between or otherwise attached to glass or plastic such that when no voltage is applied the nano-particles are arranged randomly to block light and when voltage is applied the nano-particles align to let light pass to achieve transparency; (4) micro-blinds which are composed of rolled thin metal blinds (e.g., transparent when rolled) that unroll in response to voltage to become more opaque; and (5) thermoplastics made of materials whose refractive index (and thus transparency/opacity) changes based on voltage, heat, or light. It is noted that examples above are provided by way of illustration and not as limitations. It is contemplated that any material, film, or coating whose transparency to signals of the movable sensor 101 can be used according to the various embodiments described herein.

In one embodiment, the housing 117 of the vehicle mirror assembly 109 in its entirety (or a portion of it) can be completely opaque. In other embodiments, the housing 117 can include or be made of a material whose opacity/transparency can be controlled by voltage, heat, or light (e.g., similar to materials discussed with respect to embodiments of the reflective surface 119 described above). The material, for instance, may depend on the movable sensor 101 and the type of signals emitted and/or measured. For example, if the movable sensor 101 is a camera, then the material would be transparent to visible light. If the movable sensor 101 is a LiDAR sensor, then the material would be transparent to the wavelength of the laser light used by the sensor, and so on. In one embodiment, the selective opacity/transparency of the housing 117 allows for the movable sensor 101 to have a forward-looking view through the housing 117 in addition to the rear-facing view through the reflective surface 119, thereby advantageously extending the viewing range of the movable sensor 101. That is, the movable sensor 101 may be rotated in plane up through a full range of motion depending on sensor configuration (e.g., 180 degrees, 360 degrees, etc.) capturing forward, side, rear views, and/or any other views in between. Also, in some embodiments, the selective opacity/transparency of the housing 117 and one-way mirror of the reflective surface 119 keeps the movable sensor 101 hidden from view (e.g., resulting in less chances of theft), but allowing the movable sensor 101 to operate when in use.

In one embodiment, the housing 117 can include telemetry hardware for communicating with the controller 127. The telemetry hardware, for instance, can then relay signals from the controller 127 (e.g., signals comprising or otherwise including instructions for initiating a diagnostic scan) to other components of the vehicle mirror assembly 109 including but not limited to the movable sensor 101 (e.g., to initiate capturing sensor data during a diagnostic scan), actuator assembly 125 (e.g., to modify the orientation and/or position of the movable sensor 101), housing 117 (e.g., to change opacity/transparency), and reflective surface 119 (e.g., to change opacity/transparency). In one embodiment, the housing 117 can include other openings (e.g., for electrical wiring/harness, mounting points to the vehicle 107, etc.).

In one embodiment, the movable sensor 101 can be any type of sensor that can be equipped or configured on or to the vehicle 107. Examples of the movable sensor 101 include but are not limited to a camera, radar sensor, proximity sensor, optical sensor, etc. In one embodiment, the movable sensor 101 can be displaced from or mechanically coupled to the reflective surface 119. In either case, the movable sensor 101 can be configured to either move with the movement/orientation of the reflective surface 119 or move independently from the a movement/orientation of the reflective surface 119.

The movable sensor 101 can also be mounted within the space 121 created by the housing and the reflective surface 119 (e.g., referred to as internal to the housing 117) as illustrated in variation 115a of the vehicle mirror assembly 109. In other embodiments, the movable sensor 101 can be mounted external to the housing 117 as illustrated in variation 115b of the vehicle mirror assembly 109. Although the movable sensor 101 is illustrated as being mounted to the bottom the housing 117, it is contemplated that the movable sensor 101 can be externally mounted to the housing 117 at any location including but not limited to the top, side, back, etc. If mounted externally, the movable sensor 101 can be further protected by an optional cover 123. In one embodiment, the optional cover 123 can be made of a material that is selectively transparent or opaque to the signals emitted or measured by the movable sensor 101. Examples of the material are discussed above with respect to the material of the housing 117 and reflective surface 119.

In one embodiment, the actuator assembly 125 can include but is not limited to various gears (e.g. linear, helical, worm, bevel, spur, herringbone, hypoid, etc.) that can operate to move or orient the movable sensor 101. More specifically, the actuator assembly 125 can be mechanically coupled to the movable sensor 101 and configured to move/orient the movable sensor 101 in various directions or orientations. For example, the movement or orientation of the movable sensor 101 can result in the change of a first field of view 141a (e.g., sensor coverage area) to a second field of view 141b of the movable sensor 101. This change from the first field of view 141a to the second field of view 141b advantageously enables the movable sensor 101 to provide a greater sensor coverage area compared to an equivalent fixed or non-movable sensor. Although the movable sensor 101 is shown to rotate in a single plane, it may also be configured to orient out of plane along any axis of movement.

In one embodiment, the actuator assembly 125 can also control the movement and/or orientation of the reflective surface 119. It is noted that although the actuator assembly 125 is discussed with respect to providing movement or orientation of the movable sensor 101 using gears, it is contemplated that any equivalent assembly configured to move or orient the movable sensor 101 can be used whether or not the assembly includes gears for performing the movement or orientation. Examples of non-gear assemblies include but are not limited to pistons, belts, push rods, etc.

In one embodiment, the controller 127 can control the actuator assembly 125 to result in moving or orienting the movable sensor 101 of the vehicle mirror assembly 109. For example, the controller can generate, transmit, and/or receive various signals/data (e.g., control signals for sensor movement, images, and/or other data) related to operating the vehicle mirror assembly 109 and/or any of its components (e.g., actuator assembly 125, movable sensor 101, housing 117, and/or reflective surface 119) according to the various embodiments described herein. The controller 127, for instance, can control housing opacity/transparency, and include the structures, hardware, circuitry, software, firmware, etc. to perform its functions.

In one embodiment, the controller 127 can be incorporated into the housing 117 or external to the housing (e.g., within vehicle 107 and communicatively coupled to one or more vehicle mirror assemblies 109 equipped on the vehicle 107 via a wired or wireless connection 143). In cases where the vehicle 107 includes multiple vehicle mirror assemblies 109 (e.g., respective vehicle mirror assemblies 109 on the driver's and passenger's sides of the vehicles 107), each vehicle mirror assembly 109 can be associated with its own controller 127 or one controller 127 can be configured to operate the multiple vehicle mirror assemblies 109. In some embodiments, the controller 127 can communicate with various hardware equipped in or otherwise associated with the vehicle 107 or a driver/passenger of the vehicle 107 (e.g. navigation system, heads-up display, mobile device, etc.). In addition, the controller 127 can communicate over a communication network 145 to a diagnostic platform 135, mapping platform 147 with a geographic database 149 (e.g., storing map information, route information, etc.). In addition or alternatively, the controller 127 can have a local instance of all or a portion of the geographic database 149. In one embodiment, the controller 127 and/or diagnostic platform 135 also have connectivity over the communication network 145 to a services platform 151 including one or more services 153 as well as connectivity to a content provider 155. The services platform 151, services 153, and/or content provider 155 can provide services, applications, and/or data that the controller 127 can use to generate control signals to the vehicle mirror assembly 109 (e.g., to perform a diagnostic scan according to the various embodiments described herein).

As described above, in various embodiments, the opacity/transparency of the reflective surface 119 and/or housing 117 may be selectively controlled for all or a portion of the reflective surface 119 and/or housing 117. In addition, the controller 127 can change the orientation/position of the movable sensor 101 and/or reflective surface 119 based on diagnostic scan to be performed, vehicle location, target object location, vehicle part (or vehicle area/section) under scan, navigation, road information (e.g., straight, curve, hill, etc.), map information (e.g. POIs), etc. In one embodiment, the opacity/transparency and/or orientation/position can be controlled based on where the field of view of the movable sensor 101 should be directed.

In some embodiments, a vehicle mirror assembly 109 can include multiple movable sensors 101. For example, in addition to a first movable sensor 101, the vehicle mirror assembly 109 further comprises at least one other movable sensor 101 coupled to the housing 117 or contained in the space 121 formed by the housing 117 and the reflective surface 119. Then, the opacity or transparency of respective portions of the housing 117 and/or reflective surface 119 can be selectively controlled based on the orientation, position, and/or field of view of the respective sensors 101. For example, in one embodiment, the vehicle mirror assembly 109 can include two cameras (i.e., two movable sensors 101) to provide for stereoscopic vision by working in tandem to generate a three-dimensional image (e.g., for vehicle diagnostic scans). In this embodiment, different areas of the housing 117 and/or reflective surface 119 can be made transparent so that each camera can have an unobstructed field of view to the outside of the vehicle mirror assembly 109. It is noted that the dual stereoscopic camera use case described above is provided by way of illustration and not as a limitation. It is contemplated that the vehicle mirror assembly 109 can have any number or types of movable sensors 101 that work in tandem or independently of each other to capture sensor data and provide situational awareness.

Figure 3:
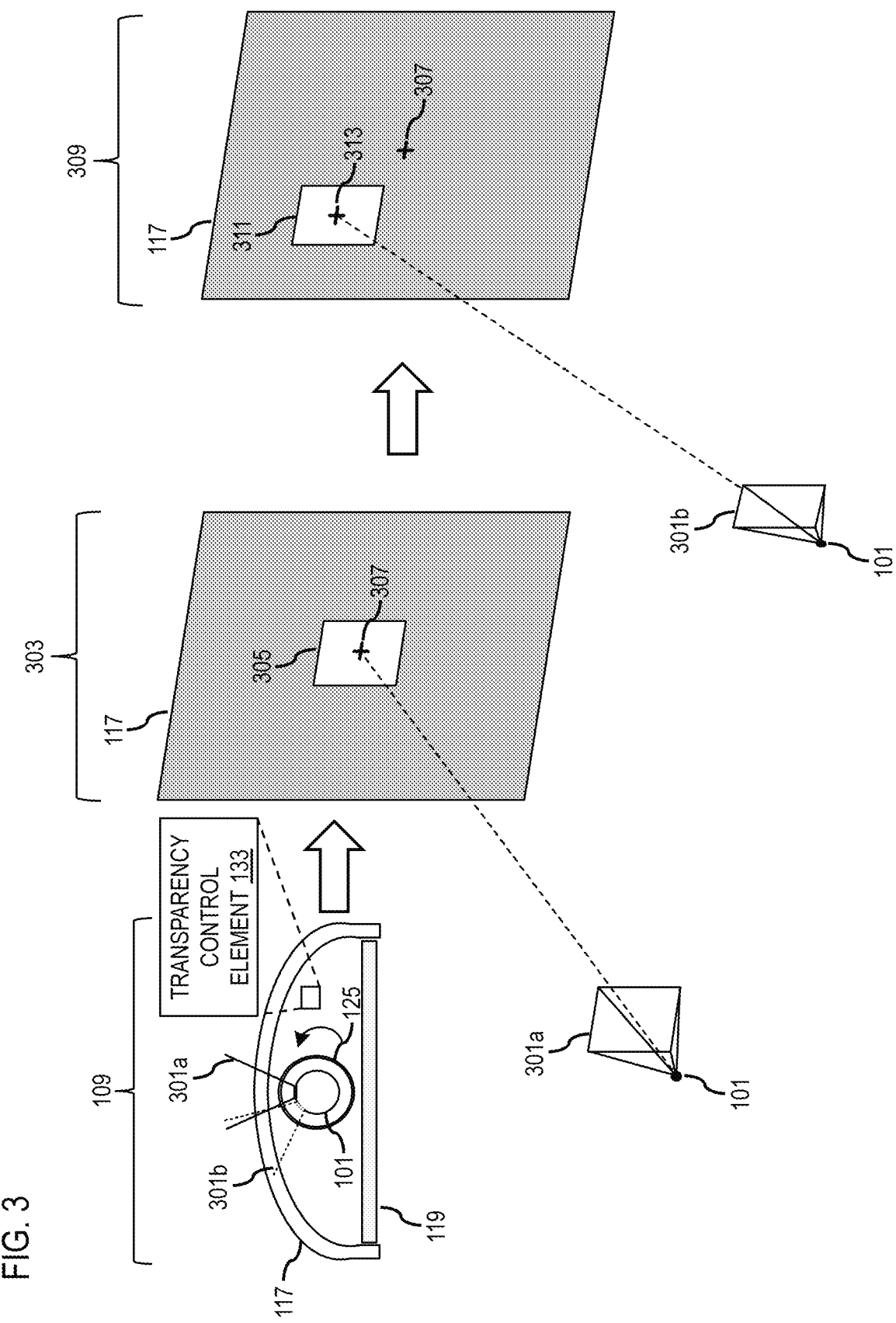
FIG. 3 is a diagram illustrating an example of controlling an opacity of a vehicle mirror assembly housing based on a field of view of a movable sensor, according to one example embodiment.

FIG. 3 is a diagram illustrating an example of controlling an opacity of a vehicle mirror assembly housing 117 based on a field of view of a movable sensor 101, according to one example embodiment. As shown, the vehicle mirror assembly 109 includes the movable sensor 101 configured to move or change orientations via the actuator assembly 125. In an initial state, the movable sensor 101 is oriented to the face the rear of the vehicle mirror assembly 109 such that the initial field of view 301*a* is forward through the housing 117. The housing 117 is made of a material for which selectable portions of the housing 117 can be made transparent to the movable sensor 101 (e.g., via the transparency control element 133). For example, if the movable sensor 101 is a camera, the housing 117 is opaque to visible light and can then be made transparent to visible light. In other words, the material of the housing 117 is initially opaque to the movable sensor 101 and can be activated (e.g., via an applied voltage, heat, or light initiated by the transparency control element 133) to become transparent to the movable sensor 101.

If the movable sensor 101 is forward facing (as in the case of field of view 301*a* that is also represented in scenario 303), opacity of the housing 117 can be selectively controlled. That is, a portion 305 of the housing 117 can be made transparent by locally applying heat, light, or voltage (e.g. using grid-like electrical structures/leads embedded or attached to the housing interior or body). In one embodiment, as shown under scenario 303, the portion 305 can be determined (e.g., by the controller 127) based on a point 307 projected from the a position of the movable sensor 101 through the center of the field of view 301*a* to the surface of the housing 117. The grid or portion 305 corresponding to the point 307 can be selected to make transparent so that the movable sensor 101 can "see" through that portion 305. Such selective transparency/opacity advantageously reduces glare, optical interference, etc.

Under scenario 309, the movable sensor 101 is reoriented to view a new field of view 301*b* that is to the left and top of the original field of view 301*a*. In this case, the controller 127 can determine a new portion 311 of the housing 117 to make transparent. This new portion 311, for instance, is determined by projecting a point 313 from the position of the movable sensor 101 through the center of the field of view 301*b* to the surface of the housing 117. Heat, light, or voltage is applied to the new portion 311 to make it transparent. In addition, heat, light, or voltage is removed from the previous portion 305 to make it opaque. In this way, as the field of view of the movable sensor 101 moves around through the housing 117, selective portions of the housing is made transparent to provide a clear line of sight for the movable sensor 101. The size of portion 305 or portion 311 may vary, depending upon the movable sensor 101 capabilities, as well as the distance between the movable sensor 101 and the housing 117.

Although not shown in the example of FIG. 3, if the movable sensor 101 faces forward (e.g., looking through the reflective surface 119 of the vehicle mirror assembly 109), light, heat, or voltage can be applied to a material or portion thereof coating or included in the reflective surface 119 to make the reflective surface 119 or portion thereof transparent to the movable sensor 101. The opacity of the optional cover 123 may also be controlled in the same way.

In one embodiment, the vehicle mirror assembly 109 in combination with the system 100 can be used to improve the safety of vehicle operation via the use of movable sensors 101. As discussed in more detail in the various embodiments below, various aspects of the vehicle mirror assembly 109 and system 100 can be used to control the movement or orientation of the movable sensor 101 of the vehicle mirror assembly 109 to perform a vehicle diagnostic scan and/or based on vehicle location on a road, position of an object of interest around the vehicle, and/or other similar factors.

Figure 4:
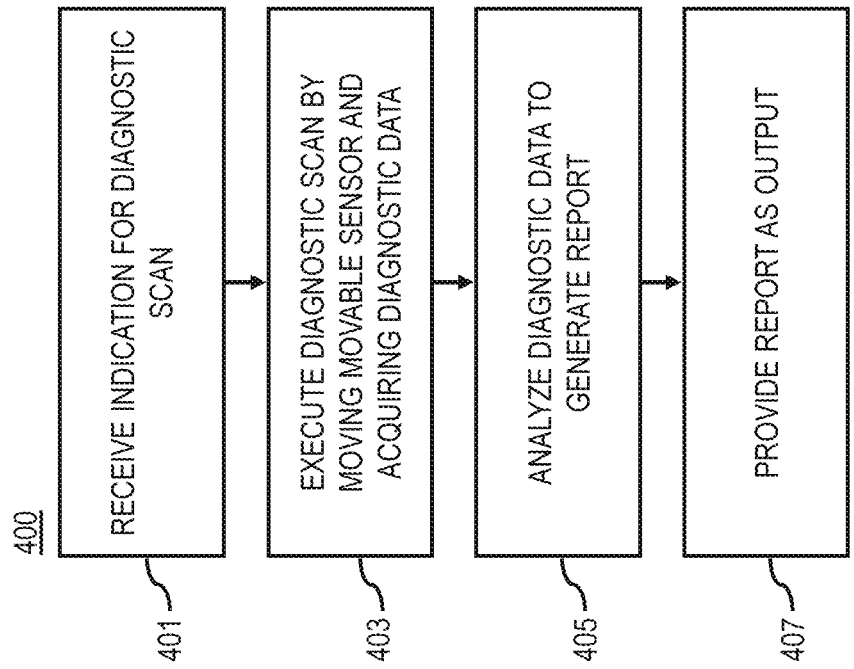
FIG. 4 is a flowchart of a process for providing vehicle diagnostics using a movable sensor, according to one example embodiment.
Figure 12:
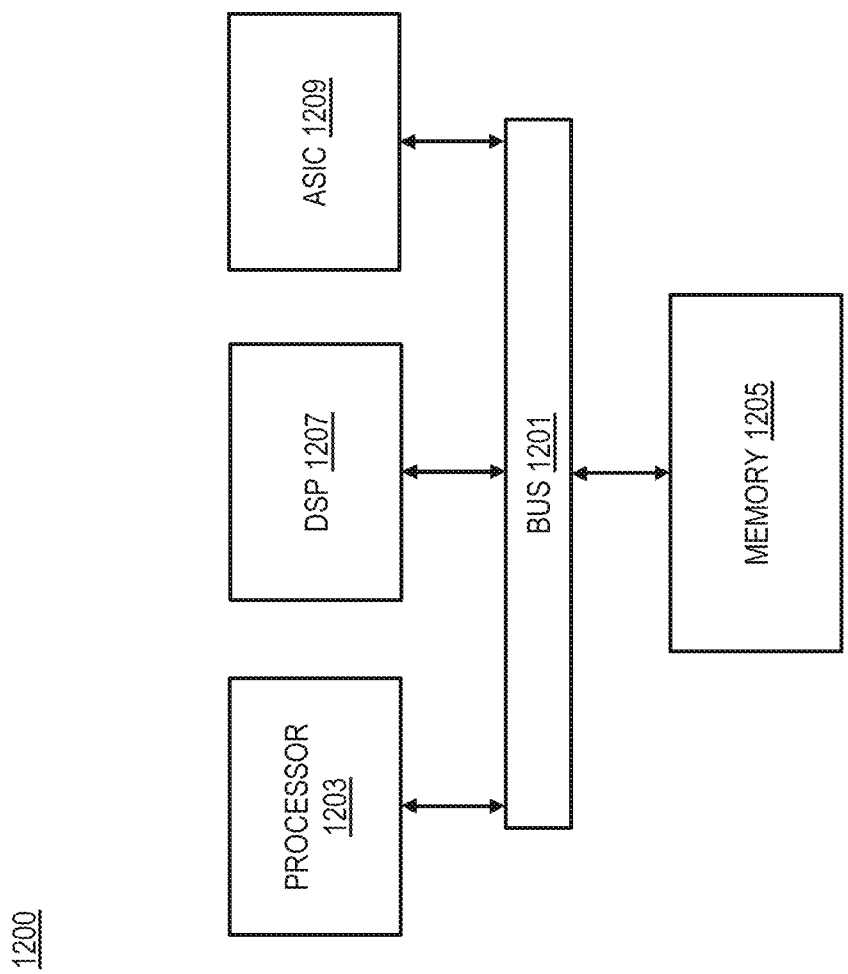
FIG. 12 is a diagram of a chip set that can be used to implement an embodiment.

FIG. 4 is a flowchart of a process 400 for providing vehicle diagnostics using a movable sensor, according to one example embodiment. In various embodiments, the diagnostic platform 135 and/or controller 127 alone or in combination with the mapping platform 147, geographic database 149, services platform 151, services 153, and/or content provider 155 may perform one or more portions of the process 300 and may be implemented in, for instance, a chip set including a processor and a memory as shown in FIG. 12 and/or other circuitry for performing one or more steps of the process 400. As such, the diagnostic platform 103 and/or controller 127 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps.

In one embodiment, the process 400 introduces a system and method for self-diagnosing a vehicle as well as apparatuses, computer readable storage media, computer program products, etc. for providing the same. For example, in summary, one example embodiment can include but is not limited to the following: receiving an indication identifying a need for a diagnostic scan; executing diagnostic scan by controlling a movable sensor and acquiring diagnostic data; analyzing the diagnostic data; and generating a report. As another example, a system can include various elements for vehicle diagnostics including but not limited to: one or more movable sensors 101, a controller 127 for directing the movement of the movable sensors; and at least one processor (e.g., associated with a diagnostic platform 135 or equivalent computing device) configured to receive the indication, direct the controller 127 to execute the diagnostic scan, process the diagnostic data acquired, and generate a report. Additional details of the process 400 are provided below.

In step 401, the diagnostic platform 135 receives an indication identifying a need for a diagnostic scan. In one embodiment, the indication can include any signal, process, or means to indicate that a diagnostic scan of one or more portions of the vehicle 107 (e.g., tires 103, body 105, etc.) is to be performed. As noted above, vehicle tires 103 and body 105 are provided by way of illustration and not as limitations. It is contemplated that the diagnostic scan can be performed to determine any condition of the vehicle 107 that can be detected or otherwise identified from the sensor data collected from the movable sensor 101 during a diagnostic scan (e.g., diagnostic data 137). In addition, the area of interest of the vehicle 107 to which the diagnostic scan is directed can include any external (e.g., tires 103, body 105, etc.) or internal (e.g., vehicle interior, occupants of the vehicle, cargo, etc.) feature or part of the vehicle 107 that is visible or has line-of-sight from the movable sensors 101.

In one embodiment, the indication identifying a need for a diagnostic scan or that can trigger a diagnostic scan can include to a manual or automated signal transmitted to or otherwise detected by the diagnostic platform 135. For example, a manual indication can include but is not limited to when user initiates a diagnostic scan (e.g. via input into a navigation system, or application on a remote/smart device). The user, for instance, can include a driver, owner, occupant, and/or any other authorized person (e.g., fleet owner/manager in case of a rental car, vehicle inspector, mechanic, etc.).

In addition or alternatively, the diagnostic platform 135, controller 127, and/or other vehicle 107 or system 100 component can automatically detect any configured triggering condition to identify a need for a diagnostic scan. Examples of these triggering conditions include but are not limited to one or more of the following:

Fuel consumption (in)efficiency detection (e.g., fuel consumption above a threshold set by historical/current/reference/etc. conditions)—for example, if fuel consumption differs by more than a threshold value over historical fuel consumption (e.g., fuel consumption determined for a previous time period, under similar environmental conditions, etc.), current conditions (e.g., fuel consumption that should be achieved given current environmental conditions such as but not limited to weather, traffic, road type, speed, etc.), and/or reference conditions (e.g., fuel consumption estimated for the vehicle 107 by a manufacturer or other authority).

Vehicle alarm activation—for example, if the vehicle 107's alarm system is activated, the alarm system can automatically signal diagnostic platform 135 to initiate a diagnostic scan around the perimeter of the vehicle. The diagnostic can attempt to identify the source of the alarm and/or monitor for any potential damage to the vehicle 107 from the source. In one embodiment, if the alarm is triggered based on proximity or directional sensors of the alarm system, the diagnostic scan can be directed to the part of the vehicle 107 indicated by the proximity or directional sensors.

Impact/vibration detection (e.g. break-in, scratches, dents)—Similar to the car alarm activation trigger described above, the vehicle 107 may include sensors to detect when the vehicle has suffered an impact from an object (e.g., small objects such as rocks, debris, etc. as well as impacts from other vehicles, pedestrians, etc.). Example sensors can include but is not limited to accelerometers or equivalent. The same sensors can also detect when the vehicle 107 is undergoing vibration (e.g., from someone touching or bumping into the vehicle). Once an impact or vibration is detected, the vehicle system (e.g., controller 127 or equivalent) can transmit the detection to the diagnostic platform 135 to initiate a diagnostic scan.

Location of the vehicle 107—in one embodiment, a diagnostic scan can be initiated based on determining that the vehicle 107 is at a location or within a threshold proximity of the location. For example, a location sensor (e.g., GPS or equivalent) can be used to determine a location of the vehicle 107. Any other form of localization can also be used (e.g., visual-based localization using imagery captured at a location) can be used to determine location. The vehicle 107's location can then be compared to a map data (e.g., stored in the geographic database 149 via the mapping platform 147) to determine whether the vehicle 107 is at or within proximity of a location that has been configured to trigger a diagnostic scan. For instance, scan may be initiated in certain parking locations, during light traffic, etc. In another use case, the diagnostic scan with the vehicle 107 has reach a return location of a rental car, a home location of a delivery truck, a user's home garage, during light traffic, at locations with high rates of vehicle damage (e.g., from road debris, rocks, etc.), and/or the like.

Nearby objects or environment—similar to the location of the vehicle 107 described above, diagnostic scans can be triggered with the vehicle 107 is within a proximity threshold of certain objects and/or environments. For example, if the vehicle 107 is within proximity of other vehicles (e.g., in a narrow parking space), a diagnostic scan can be triggered to determine potential damage (e.g., from door dings). Other examples include being near a curb when a diagnostic scan can be used to identify potential curb rash to the wheels and/or tires. In yet other examples, proximity to certain buildings, points of interest (POIs), roads, etc. can also trigger diagnostic scans. In one embodiment, the objects or environments that trigger a diagnostic scan can be determined from map data (e.g., the geographic database 149).

Navigation route entry—in one embodiment, the diagnostic platform 135 can trigger a diagnostic scan one a navigation route is entered, requested, started, or completed in a navigation system of a vehicle 107. For example, the navigation system of the vehicle 107 or equivalent system (e.g., navigation application executing on a mobile device of an occupant of the vehicle 107) can transmit a request to initiate a diagnostic scan based on the status or progress of a navigation route (e.g., perform a safety check prior to departure, or upon arrival).

Contextual parameter (e.g., time of day/weather)—in one embodiment, the diagnostic platform 135 can determine whether one or more contextual parameters meet criteria for initiating a diagnostic scan (e.g., inspection at specific time of day, during specific conditions, etc.). For example, after a hailstorm is detected, the diagnostic platform 135 can initiate a diagnostic scan to detect potential damage to body 105 of the vehicle 107, or during or prior to a rainstorm, the diagnostic platform 135 can initiate a diagnostic scan to determine the condition of the vehicle 107's tires 103.

Periodically or based on a schedule (e.g. weekly, monthly, yearly)—in another embodiment, the diagnostic platform 105 can be configured to perform a diagnostic scan according to a preconfigured schedule or time interval.

It is noted that the examples of indications for identifying a need for a diagnostic scan (e.g., conditions for triggering a diagnostic scan using a movable sensor 101) described in the various embodiments above are provided by way of illustration and not as limitations. It is contemplated that any other indication or triggering condition (manual or automated) may be used according to the various embodiments described herein.

In step 403, after receiving an indication identifying a need for a diagnostic scan, the diagnostic platform 135 executes the diagnostic scan by interacting with the controller 127 to initiate a movement of a movable sensor 101 of a vehicle mirror assembly 109 attached to a vehicle 107 and acquiring diagnostic data 137 during the movement of the movable sensor 101. In other words, in one embodiment, the diagnostic platform 135 initiates or executes a diagnostic scan by directing the movable sensor 101 to sweep in a controlled pattern. Sweeping, for instance, refers to specifying an area of the vehicle 107 and/or its environment over which the movable sensor 101 is moved so that its field of view is able to capture diagnostic data 137 (e.g., sensor data) of the area. In one embodiment, instead of performing a sweep, the movable sensor 101 can be moved so that its field of view is directed to a specific area of interest on or in the vehicle 107. The type of sensor data to be collected during the diagnostic scan depends on the type of sensor(s) used in the movable sensor 101. For example, the sensor data or diagnostic data 137 comprises image data which the movable sensor 101 is a camera. Similarly, the diagnostic data 137 can comprise other data when using other sensor types (e.g., using optical, sound, infrared, LiDAR sensors/detectors, etc.) as the movable sensor 101.

Examples of movement of the movable sensor 101 in a controlled pattern is illustrated with respect to FIG. 2 above as well as with respect to FIG. 5 below. As previously described, FIG. 2 illustrates an example sweep pattern for capturing diagnostic data 137 for the vehicle body 105 as well as its surrounding environment. Although, the example of FIG. 2 is illustrated as performing a diagnostic scan of the vehicle body 105 on the driver's side, it is contemplated that a diagnostic scan can also be performed on the right side of the vehicle (e.g., as an alternative to, concurrently with, or sequentially to the illustrated diagnostic scan of the left or driver's side).

Figure 5:
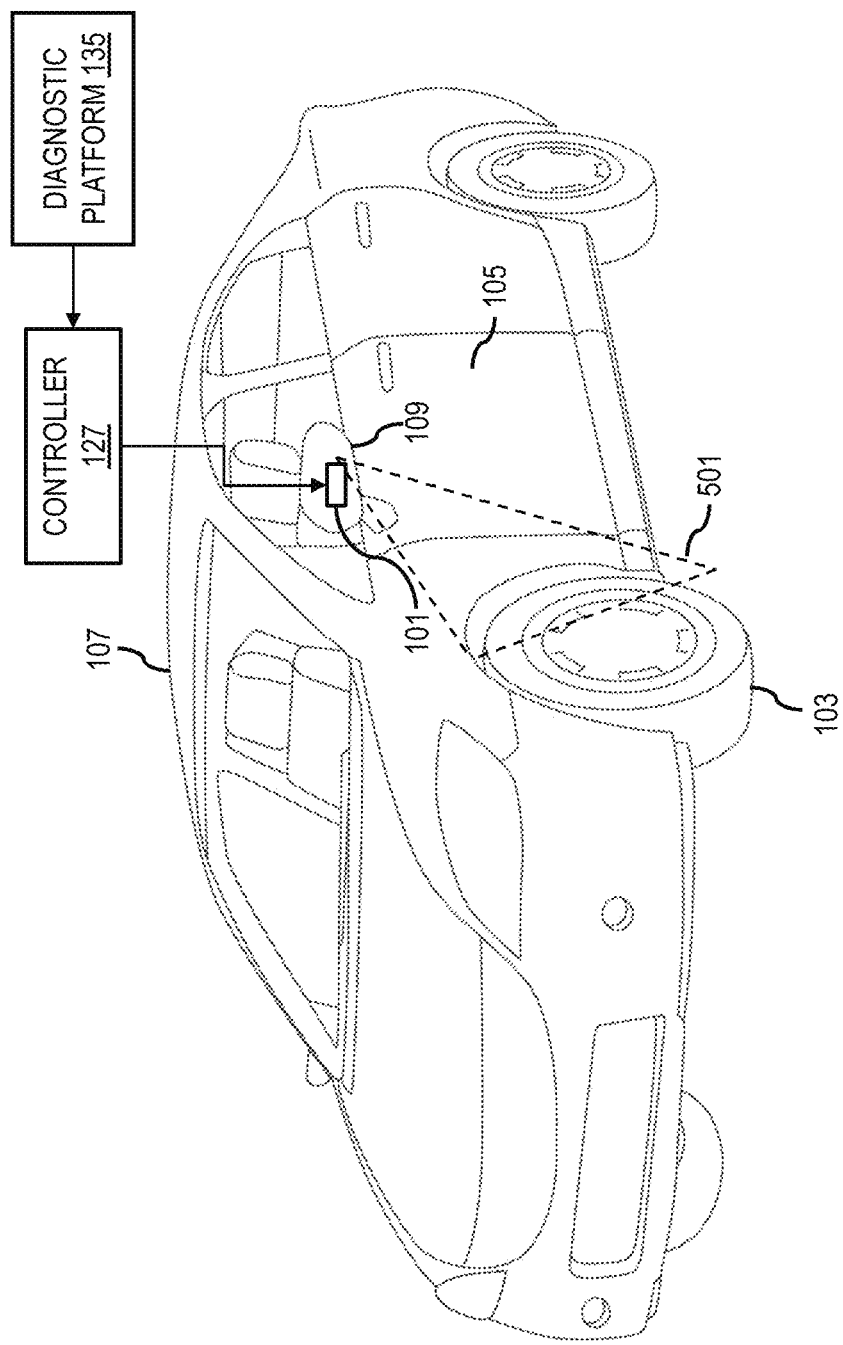
FIG. 5 is a diagram illustrating an example of movable sensor used for vehicle diagnostics to perform as diagnostic scan on vehicle tires and/or wheels, according to one example embodiment.

FIG. 5 is a diagram illustrating an example of movable sensor 101 used for vehicle diagnostics to perform as diagnostic scan on vehicle tires 103 and/or wheels, according to one example embodiment. As shown, the vehicle 107 is equipped with a vehicle mirror assembly 109 including a movable sensor 101. The diagnostic platform 135 initiates a diagnostic scan by instructing the controller 127 to actuate the movable sensor 101 to bring the vehicle tire 103 into its field of view 501 (e.g., to scan the vehicle tire 103 and/or wheel for damage or wear). In this example, the movable sensor 101 is a camera configured to capture image data. Sensor data (e.g., image data) from the movable sensor 101 that depict the vehicle tire 103 and wheel is captured. The image data can then be analyzed, e.g., using computer vision and machine learning based feature detection, to identify damage or wear to the vehicle tire 103 and/or wheel as well as surrounding areas (e.g., by analyzing the image data to determine the wear patterns, damage, etc.).

In one embodiment, the movement of the movable sensor 101 can be performed as described in the various embodiment of FIGS. 1-3 above as well as FIG. 9 below. As described in some of those embodiments, the movement of the movable sensor 101 can also be accompanied by making the housing 117 and/or reflective surface 119 of the vehicle mirror assembly 109 selectively transparent so that the signals measured or emitted by the movable sensor 101 passes through the vehicle mirror assembly 109.

In one embodiment, the movement of the movable sensor 101 during the diagnostic can be accompanied by or otherwise coordinated with other actions of the vehicle 107 and/or vehicle mirror assembly 109. For example, the diagnostic platform 135 can interact with the controller 127 to deploy the movable sensor 101 away from the vehicle 107 (e.g., to provide a better field of view of the vehicle 107, vehicle body 105, vehicle tires 103, and/or its surrounding. This optional sensor deployment may consider environmental, proximity, traffic, map, and/or other factors to determine whether the sensor deployment is appropriate or needed. For example, if the vehicle 107 is located close to another vehicle or object (e.g., parked in a narrow parking spot next to another vehicle), the movable sensor 101 may not be deployed away from the vehicle 107 to reduce the risk of hitting the other vehicle with the deployed sensor. In another example, map data may indicate that the vehicle 107 is parked next to a bicycle lane and deploying the movable sensor 101 away from the vehicle 107 may encroach into the bicycle lane. As a result, the movable sensor 101 would not be deployed.

Figure 6A:
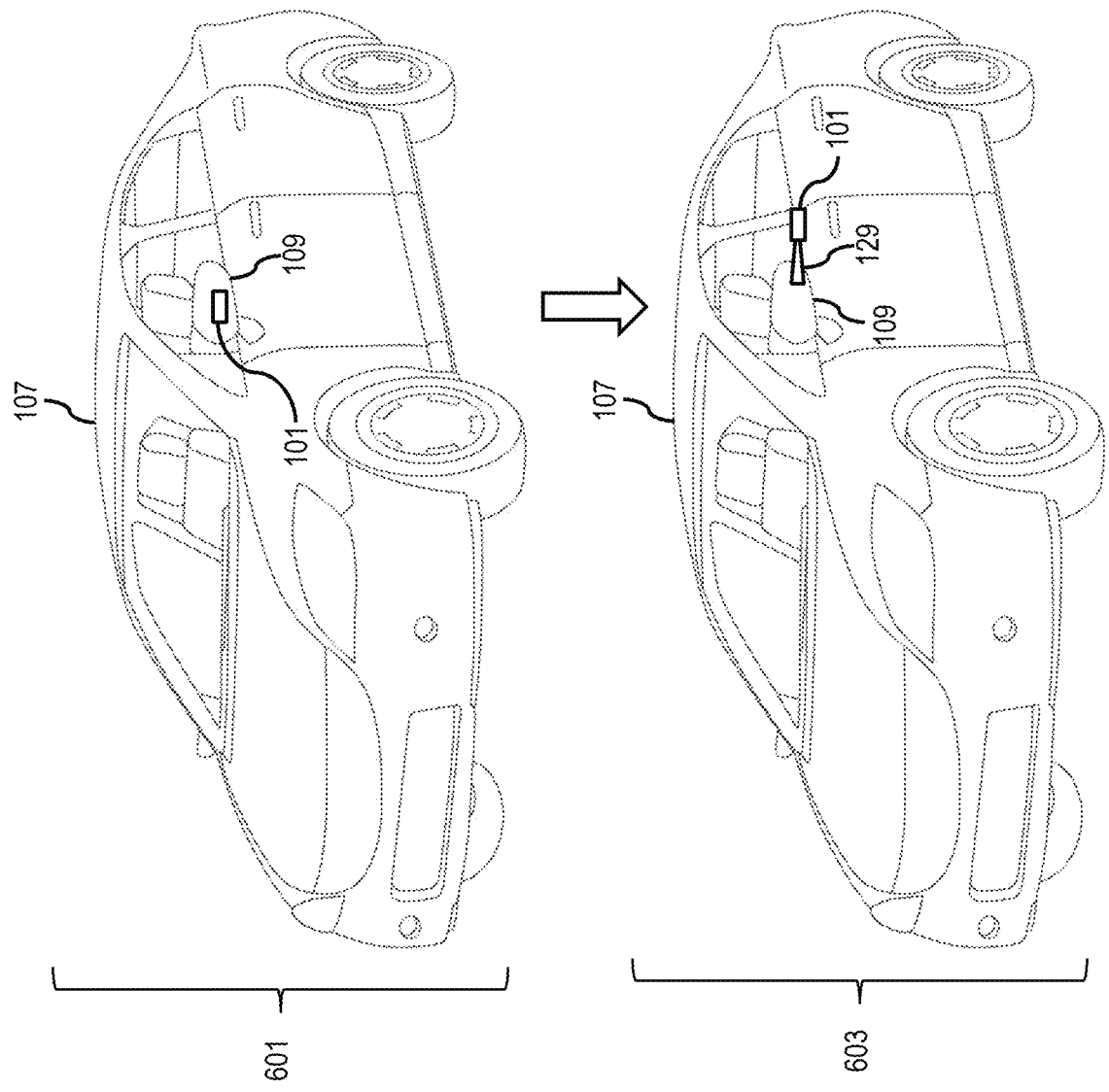
FIGS. 6A and 6B are diagrams illustrating an example of sensor deployment and diagnostic scanning, according to one example embodiment.

FIG. 6A is a diagram illustrating an example of deploying a movable sensor 101 away from the vehicle 107, according to one example embodiment. As shown, in configuration 601, the movable sensor 101 (e.g., capable of deploying away from the vehicle 107) of the vehicle mirror assembly 109 is in its retracted or nondeployed state (e.g., movable sensor 101 is inside the space 121 of the vehicle mirror assembly 109). For sensor deployment, configuration 601 is transformed to configuration 603. In configuration 603, the movable sensor 101 is in a deployed state in which the movable sensor 101 is extended outside of the vehicle mirror assembly 109 on telescoping arm 129 (e.g., through a portal 131—not shown in FIG. 6A) away from the vehicle 107. In one embodiment, the distance that the movable sensor 101 is extended away from the vehicle 107 is selectable up to the maximum extended length of the telescoping arm 129.

Figure 6B:
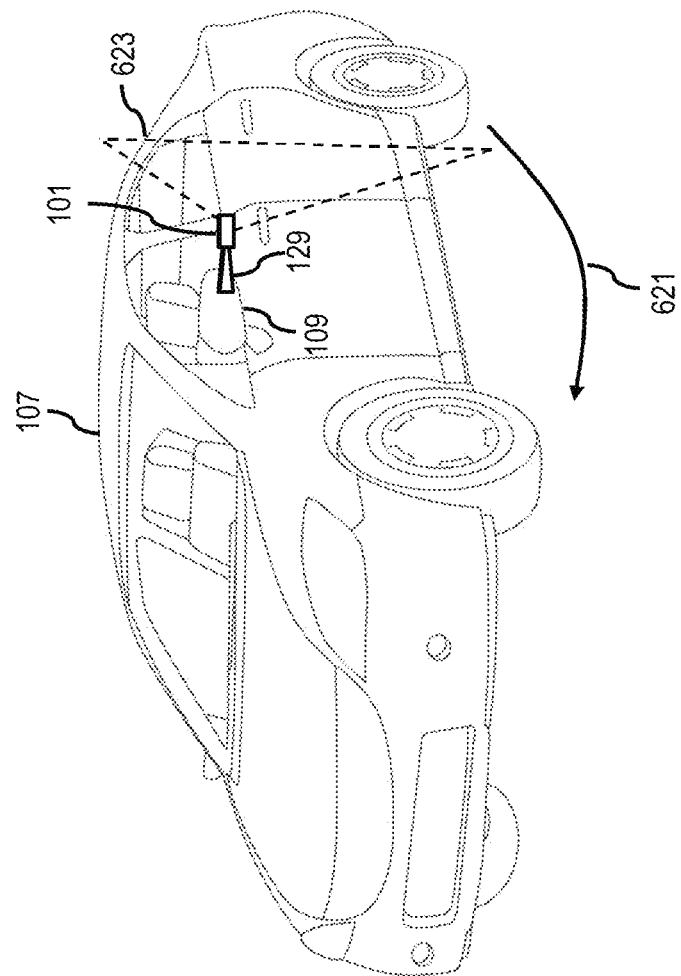

FIG. 6B is a diagram illustrating an example of performing a diagnostic scan after deployment of the movable sensor 110 away from the vehicle 107, according to one example embodiment. The example of FIG. 6B continues the example of FIG. 6A and illustrates the movable sensor 101 in a deployed state in which it is extended at the end of the telescoping arm 129 from the vehicle mirror assembly 109. This extended position enables the movable sensor 101 to perform a complete sweep 621 of the movable sensor 101's field of view 623 (e.g., imaging or any other form of diagnostic data gathering) of the vehicle 107 and/or its surrounding environment. Although the example is illustrated with the movable sensor 101 being deployed horizontally away from the vehicle 107, it is contemplated that the movable sensor 101 may be deployed horizontally, vertically, or at an angle depending on the desired scan.

In one embodiment, the diagnostic scan can include changing a feature or mode of operation of the movable sensor 101 during the scan. For example, changing the feature or mode of operation can include but is not limited to adjusting focus/zoom, opening a portal 131 in the mirror housing 117, changing the transparency/opacity of the housing 117 and/or reflective surface 119 of the vehicle mirror assembly 109, changing the signal frequency emitted or measured by the movable sensor 101 (e.g., hyperspectral scan), etc.

In yet another embodiment, the diagnostic scan can be accompanied by or otherwise include activating/operating functions on the vehicle or providing directions/haptic feedback for operating the vehicle. The activating/operating of vehicle functions can be related to making one or more parts of the vehicle 107 (e.g., tires 103, body 105, etc.) more visible to the movable sensor 101. For example, the activating/operation of the vehicle functions can include but is not limited to turning steering wheel to make the tires 103 more visible (e.g., turning the steering wheel to the right to make the tread of the left tire more visible or conversely turning the steering wheel to the left to make the tread of the right tire more visible). Other examples include but are not limited to: moving vehicle forward/backward (e.g., to expose different parts of the tires 103); opening/closing doors, trunks, hoods, etc.; turning off or on vehicle lights (e.g., headlights, turn signals, brake lights, interior lights, etc.); extending or retracting other sensors or components of the vehicles (e.g., other sensors, antenna, etc.). The specific function or feature of the vehicle to activate or operation can be determined based on the desired diagnostic scan and/or the target of the scan.

In addition, the diagnostic scan may be performed while the vehicle 107 is moving or stationary. For example, if the vehicle 107 encounters a triggering condition or indication of a need for a diagnostic scan while traveling (e.g., hitting a pothole, encountering road debris, etc.), then the diagnostic scan can be initiated without the vehicle 107 needing to stop or remain stationary. In some cases, a desired diagnostic scan can be only performed while stationary or moving depending on the target or purpose of the scan. For example, certain vehicle conditions or issues (e.g., tire vibration or wobble above a certain speed, suspension travel, loose body panel, etc.) may only become apparent when the vehicle 107 is moving, while other conditions are apparent only when the vehicle 107 is stationary. Accordingly, in one embodiment, some diagnostic scans are configured to be performed while in motion while other diagnostic scans are configured to be performed while stationary, and yet other diagnostic scans are configured to be performed while in motion or stationary.

In step 405, after the diagnostic scan using the movable sensor 101 is completed, the diagnostic platform 135 analyzes the diagnostic data 137 to generate a diagnostic report 139. Examples of the diagnostic data 137 resulting from the diagnostic scan include but are not limited to:
  Image data to determine
    tire pressure/wear/integrity/punctures/wobble
    body damage (dents, scratches, corrosion)
  Optical (e.g. laser), sound, infrared, LiDAR data to indicate
    body damage/corrosion—e.g., signals reflecting off the body surface, or paint/body layers beneath the surface can be indicative of damage/corrosion.
    low/changes in tire pressure—e.g., a laser can be used measure the distance to the ground, which can then be used to compute the height of the vehicle. A lower-riding vehicle is indicative of lower tire pressure. Similarly, lasers can be used to determine tread depth.

In one embodiment, the diagnostic platform 135 may apply various machine vision/learning algorithms (or equivalent) to analyze the collected diagnostic data 137 to determine a condition of the vehicle 107. For example, an algorithm may be trained to identify different types of tire wear, over-inflation, under-inflation, as well as signs of puncture, etc. from images. Similarly, an algorithm may be trained to identify problems in the vehicle body that may lead to further complications, e.g., corrosion, etc.

Figure 7:
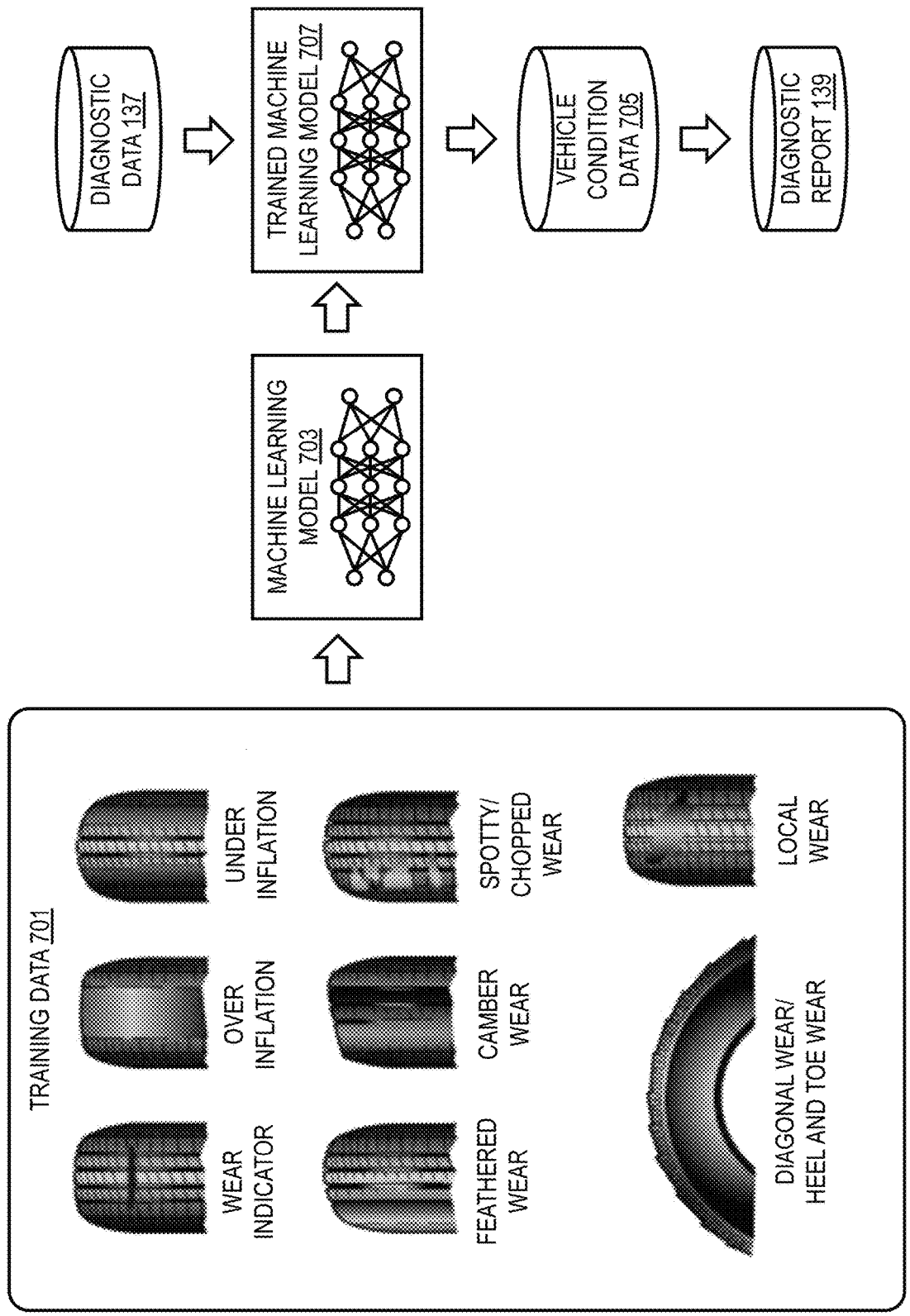
FIG. 7 is a diagram illustrating an example of training a machine learning model to predict a vehicle condition from diagnostic data, according to one example embodiment.

FIG. 7 is a diagram illustrating an example of training a machine learning model to predict a vehicle condition from diagnostic data 137, according to one example embodiment. In this example, the vehicle conditions of interest tire conditions detectable from diagnostic data 137 comprises image data. To begin training, ground truth training data 701 is collected and includes a set of training images depicting various tire conditions along with their annotated ground truth labels. The tire conditions include but are not limited to visibility of a wear indicator, over-inflation, under-inflation, feathered wear, camber wear, spotty/chopped wear, diagonal wear/heel and toe wear, and local wear. The training data 701 is then used to train a machine learning model 703 (e.g., a neural network or equivalent).

In one embodiment, multiple different loss functions and/or supervision schemes can be used alternatively or together to train the machine learning model 703 to determine a vehicle condition are part of analyzing the diagnostic data 137. One example scheme is based on supervised learning. For example, in supervised learning, the diagnostic platform 135 can incorporate a learning model (e.g., a logistic regression model, Random Forest model, and/or any equivalent model) to train the machine learning model 703 to make predictions (e.g., vehicle condition data 705) from input features or signals (e.g., features extracted from the diagnostic data 137). During training, the diagnostic platform 135 can feed feature sets from the training data 701 into the machine learning model 703 to make predictions using an initial set of model parameters. The diagnostic platform 135 then compares the predictions and predicted matching probability to ground truth data in the training data 701 for each training example (e.g., images labeled ground truth vehicle/tire conditions) used for training. The diagnostic platform 135 then computes an accuracy of the predictions (e.g., via a loss function) for the initial set of model parameters. If the accuracy or level of performance does not meet a threshold or configured level, the diagnostic platform 135 incrementally adjusts the model parameters (e.g., via back propagation and gradient descent) until the machine learning model 703 generates predictions at a desired or configured level of accuracy with respect to the annotated labels in the training data (e.g., the ground truth data). In other words, a "trained" machine learning model 707 has model parameters adjusted to make accurate predictions (e.g., vehicle condition predictions) with respect to the training data set. In the case of a neural network, the model paraments can include, but are not limited, to the coefficients or weights and biases assigned to each connection between neurons in the layers of the neural network.

In one embodiment, the trained machine learning model 707 can then be used to process newly collected diagnostic data 137 to predict vehicle condition data 705. The predicted vehicle condition data 705 can then be used to generate a diagnostic report 139 on the condition of the subject vehicle 107. It is noted that although the various embodiments are discussed with respect to training the machine learning model 703 to predict vehicle tire condition from image data, it is contemplated that a similar or equivalent machine learning process can be applied to train a machine learning model to predict or classify any other type of diagnostic data 137 (e.g., optical, sound, LiDAR, infrared, etc. data) to determine any condition of the vehicle 107, tires 103, and/or body 105, and/or to make predictions relating to the vehicle condition (e.g., safety risk, wear rate, impacts on performance, etc. as further described below).

For example, in one embodiment, the diagnostic platform 135 may predict future issues/risk based on the diagnostic data 137 resulting from a diagnostic scan. For instance, based on a specific condition of the tires ascertained from a diagnostic scan, a risk for a catastrophic event may be determined or quantified. For example, a 10% tire wear (e.g., equivalent to 10/32" tread depth) may correspond with 0% risk of blowout, but a 70% wear (e.g., ³⁄₃₂" tread depth) might indicate a 95% risk. Similarly, a type of body damage determined from the diagnostic data 137 may correspond to a risk (e.g., risk associated with corrosion, excessive fuel consumption, etc.).

In one embodiment, the diagnostic platform 135 may use historical/reference data to identify changes in the condition of the vehicle 107, tires 103, and/or body 105. For example, a current vehicle condition (e.g., tire or body condition) can be determined from a diagnostic scan and then compared against historical or reference data to identify the changes. Historical data can include vehicle condition data collected in the past for the same vehicle 107 and/or other similar vehicle types (e.g., same make, model, and trim level). Reference data can include but is not limited to specification data for the vehicle 107, tires 103, and/or body 105 as provided by a vehicle manufacturer, parts manufacturer, mechanic, crowd sourced data, etc.

In some embodiments, the diagnostic platform 135 can execute two or more diagnostic scans taken at different times to make a prediction for wear or other problems that develop over time (e.g., via linear/non-linear interpolation, or some other wear or risk model). In other words, the diagnostic platform 135 can initiate a subject diagnostic scan at a subsequent time from the diagnostic scan (e.g., after completing an initial diagnostic scan), and then predict a vehicle problem based on the diagnostic scan and the subsequent diagnostic scan. For example, multiple diagnostic scans of the tires 103 can be taken over time to determine whether the wear rate of the tires 103 is greater or lesser than expected. Similarly, multiple diagnostic scans of the paint on the body 105 of the vehicle 107 can be performed over time to determine the progress of corrosion or sun damage.

When making determinations or predictions, the diagnostic platform 135 can use various information in addition to the diagnostic data 137. For example, map information (e.g., location, road type, traffic, construction, etc.), environment information (e.g., temperature, relative humidity, season, etc.), and vehicle information (e.g., tire tread/type, body type, etc.) can be used to predict vehicle conditions and/or related risks (e.g., tire wear or risk for catastrophic event such as tire failure). In other words, the diagnostic platform 135 can query for contextual information associated with the vehicle, an environment of the vehicle, map information associated with a location of the vehicle, or a combination thereof (e.g., for data sources such as the geographic database 149 or other data sources available from the services platform 151, services 153, content providers 155, and/or other equivalent data providers).

In one embodiment, as part of the analysis, the diagnostic data 137 may be pre-processed or enhanced in a variety of ways, including but not limited to spectral/color selection, filtering, masking, editing, etc. to facilitate feature extraction used during the embodiments of machine vision/learning algorithms described in the embodiments of above. In addition, various data representations can be created as inputs to the machine vision/learning algorithms or equivalent processing technique. For example, depth, height, or laser reflection measurements can be used to assemble an image, and the image can be provided as diagnostic data 137.

In one embodiment, the diagnostic platform 135 uses the vehicle condition data 705 generated from the analysis of the diagnostic data 137 to generate a diagnostic report 139 indication a condition or status of the vehicle 107, tires 103, body 105, and/or any other component of the vehicle 107. The diagnostic report 139 is an automatically generated report (e.g., by fitting the vehicle condition data 705 to one or more configured report templates) and may provide a variety of information, in any format, to different systems and/or devices (e.g. navigation system, heads-up display, mobile device, services platform 151, services 153, content provider 155, mapping platform 147, etc.). For example, the diagnostic report 139 may include elements such as but not limited to:

Representations of a vehicle condition, a wheel or tire condition, a vehicle body condition, or a combination thereof such as but not limited to images/scans of body damage, tire issues, and/or any other machine detectable condition of the vehicle 107;

Recommendations for addressing the issues with the tires 103, bod 105, and/or any other condition of the vehicle 107;

Executable instructions determined based on the vehicle condition, wheel or tire condition, and/or any other condition of the vehicle 107 (e.g., instructions to control an autonomous vehicle to pull over, or to drive toward a specific destination, like an auto body shop); or Alerts indicating the vehicle condition, wheel or tire condition, and/or any other condition of the vehicle 107 (e.g., low tire pressure, punctured tire, presence of corrosion/damage, etc.)

Figure 8:
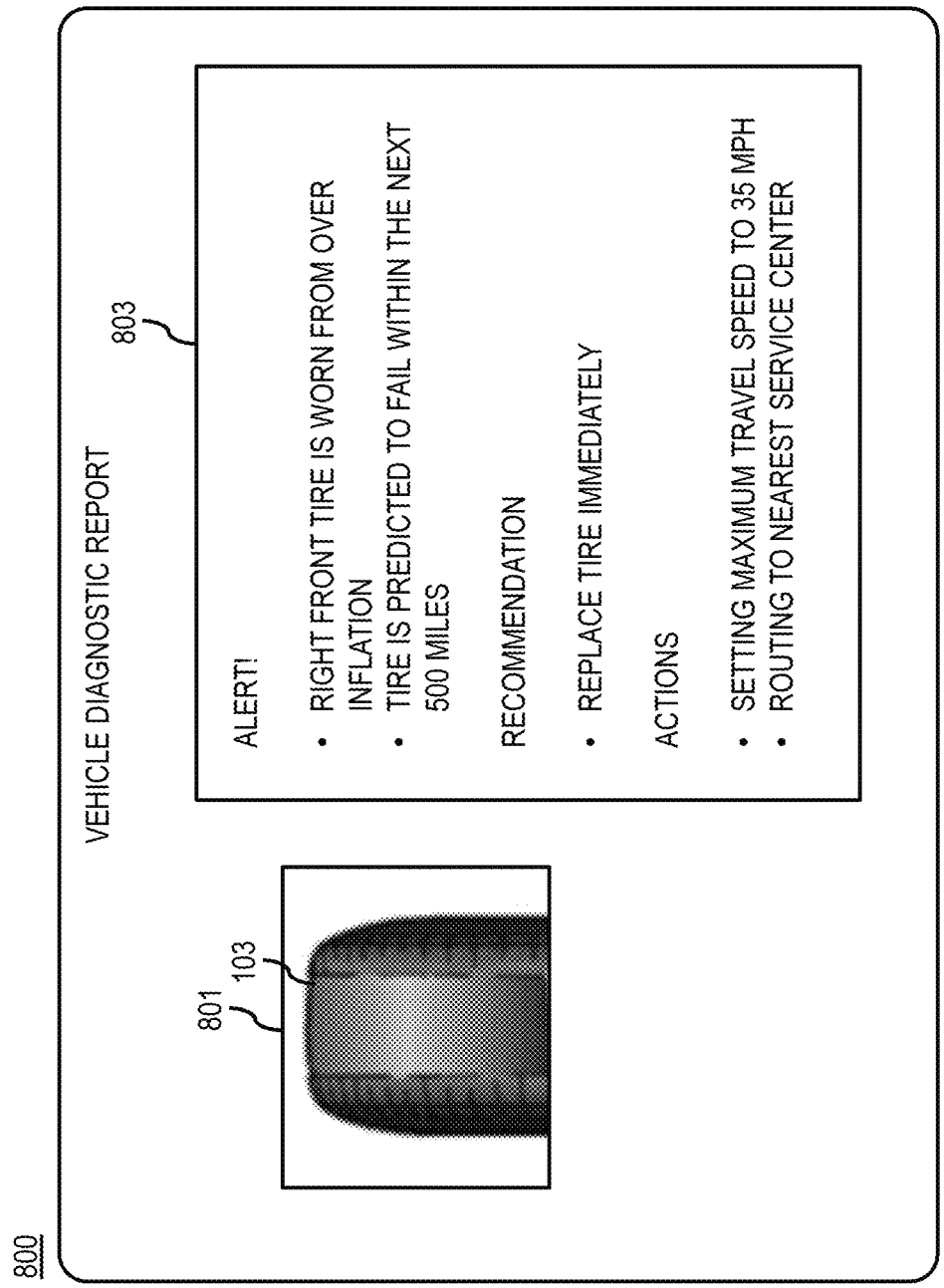
FIG. 8 is a diagram illustrating an example vehicle diagnostic report, according to one example embodiment.

FIG. 8 is a diagram illustrating an example vehicle diagnostic report, according to one example embodiment. In the example of FIG. 8, a vehicle 107 (not shown) has completed a navigation route and parked at a destination.

The parking event triggers an automatic diagnostic scan using a movable sensor 101 of the vehicle 107's vehicle mirror assembly 109 according to the various embodiments described herein. The diagnostic scan has captured images of the tires 103 of the vehicle 107 and provided the images as diagnostic data 137 for analysis to determine a condition of the tires 103. The diagnostic platform 135 has processed the diagnostic data 137 using a machine learning model trained to identify tire conditions and related risks.

The output of the analysis of the diagnostic data 137 is presented in user interface (UI) 800 of FIG. 8. As shown, UI 800 includes a UI element 801 that presents a representation of a tire 103 that has been determined to suffer from a vehicle condition defect (e.g., loss of tire tread from over inflation). The vehicle diagnostic report UI 800 also presents a UI element 803 that displays an alert message indicating that the "Right front tire is worn from over inflation" and the "Tire is predicted to fail within the next 500 miles." The UI element 803 also presents recommendation (e.g., "Replace tire immediately") and actions or instructions to be performed (e.g., "Setting a maximum travel speed to 35 mph" and "Routing to nearest service center.").

If the vehicle 107 is an autonomous vehicle, the vehicle 107 can be configured to perform one or more actions automatically or otherwise presented to a driver/occupant to approve to perform. For example, in embodiments where the vehicle 107 supports autonomous or semi-autonomous mode of operation, the signals can include instructions for the vehicle 107 to take maneuvers, initiate one of the safety features described above, etc. without intervention from the driver or passenger in response to the diagnostic report 139. In some cases, the vehicle 107 can use the signals from the system 100 to determine the mode of operation (e.g., autonomous mode, semi-autonomous mode, or manual mode) of the vehicle 107 based on the risk level estimated from the sensor data 105 of the movable sensor 101 of the vehicle mirror assembly 109. It is contemplated that the vehicle 107 can support any number of autonomous driving modes. The vehicle 107, for instance, can be an autonomous vehicle or highly assisted driving vehicle that is capable of sensing its environment and navigating within a road network without driver or occupant input. It is noted that autonomous vehicles and highly assisted driving vehicles are part of a spectrum of vehicle classifications that can span from no automation to fully autonomous operation. For example, the U.S. National Highway Traffic Safety Administration ("NHTSA") defines six levels of vehicle automation:

Level 0 (No-Automation)—"Zero autonomy; the driver performs all driving tasks.";

Level 1 (Driver Assistance)—"Vehicle is controlled by the driver, but some driving assist features may be included in the vehicle design.";

Level 2 (Partial Automation)—"Vehicle has combined automated functions, like acceleration and steering, but the driver must remain engaged with the driving task and monitor the environment at all times.";

Level 3 (Conditional Automation)—"Driver is a necessity, but is not required to monitor the environment. The driver must be ready to take control of the vehicle at all times with notice.";

Level 4 (High Automation)—"The vehicle is capable of performing all driving functions under certain conditions. The driver may have the option to control the vehicle."; and Level 5 (Full Automation)—"The vehicle is capable of performing all driving functions under all conditions. The driver may have the option to control the vehicle."

The various embodiments described herein are applicable to vehicles that are classified in any of the levels of automation (levels 0-5) discussed above.

Figure 9:
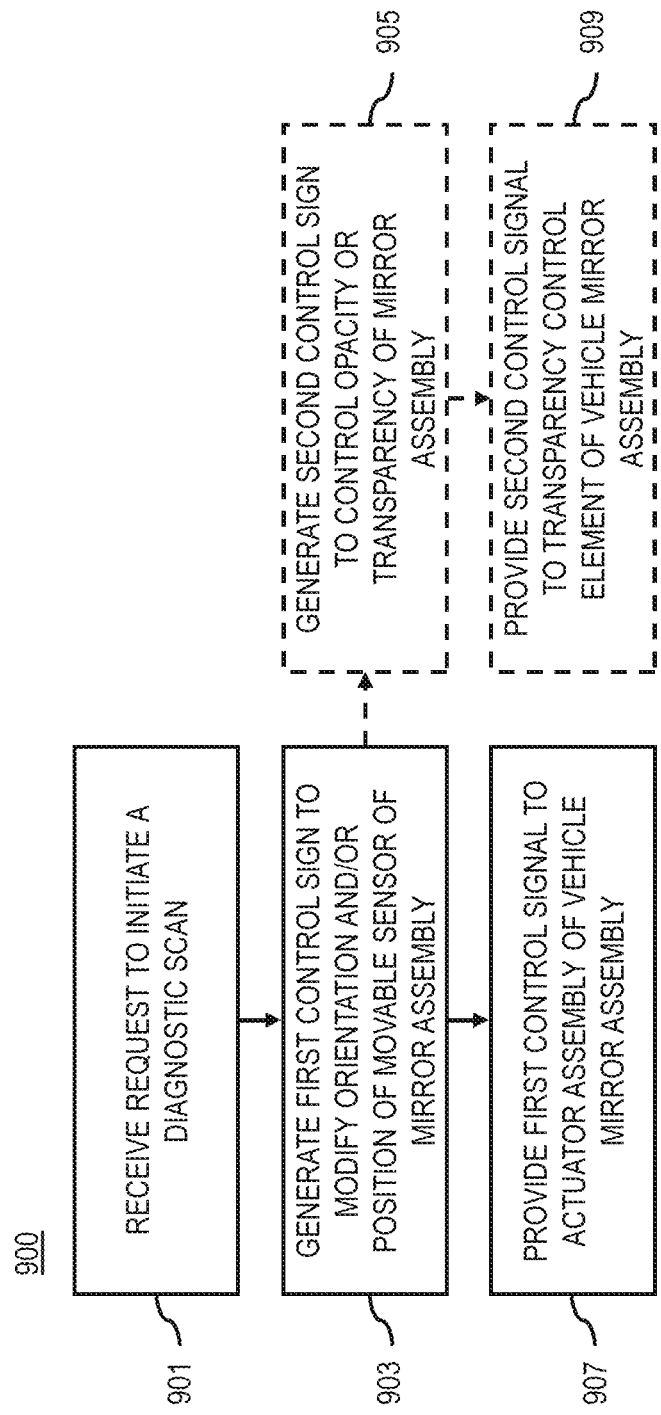
FIG. 9 is a flowchart of a process for controlling a vehicle mirror assembly with a movable sensor, according to one example embodiment.

FIG. 9 is a flowchart of a process 900 for controlling a vehicle mirror assembly 109 with a movable sensor 101 to perform a diagnostic scan, according to one example embodiment. In various embodiments, the controller 127 alone or in combination with the mapping platform 147, geographic database 149, services platform 151, services 153, and/or content provider 155 may perform one or more portions of the process 900 and may be implemented in, for instance, a chip set including a processor and a memory as shown in FIG. 12 and/or other circuitry for performing one or more steps of the process 900. As such, the controller 127 can provide means for accomplishing various parts of the process 900, as well as means for accomplishing embodiments of other processes described herein in conjunction with other components of the system 100. Although the process 900 is illustrated and described as a sequence of steps, its contemplated that various embodiments of the process 900 may be performed in any order or combination and need not include all of the illustrated steps.

In step 901, the controller 127 receives (e.g., from the diagnostic platform 135) a request to initiate a diagnostic scan of a vehicle 107. For example, the request can be based a location of a vehicle 107, a location of an object of interest, navigation information, map information, an orientation of a reflective surface 119 of the vehicle mirror assembly 109, and/or any other indication for a need for the diagnostic scan as described in the various embodiments above. For example, the various triggering parameters for initiating a diagnostic scan can be determined as follows:

Location of vehicle 107 to which the vehicle mirror assembly 109 is attached (e.g., as a side mirror) can be determined using a Global Navigation Satellite System (GNSS) (e.g., GPS, GLONASS, etc.), radar, proximity, image processing and/or any other equivalent localization techniques;

Location of one or more objects of interest can be determined using image processing of geotagged image data (e.g., captured from the movable sensor 101 or any other sensor of the vehicle 107, nearby vehicles, infrastructure sensors, etc.), visual odometry, and/or other equivalent techniques;

Navigation information indicating a navigation route planned for the vehicle 107 via an onboard navigation system, the mapping platform 147, or equivalent navigation routing engine;

Map information indicating map features (such as but not limited to road networks, road features, road attributes, terrain features, etc.) can be determined from the geographic database 149 (e.g., using a local instance or cloud-based instance via the mapping platform 147); and An orientation of the reflective surface 119 can be determined from the telemetry hardware of the vehicle mirror assembly 109 or equivalent.

In step 903, the controller 127 generates a first control signal to modify an orientation, a position, or a combination thereof of a movable sensor of the vehicle mirror assembly 109 to perform the requested scan. In one embodiment, the requested diagnostic scan can be performed as a sweep over a predefined or otherwise targeted area of the vehicle 107, tire 103, body 105 of the vehicle, and/or its surrounding environment. Alternatively, the scan can be directed to a specific location on the vehicle 107, tire 103, body 105, and/or surrounding environment. In embodiments in which the opacity/transparency of the housing 117 and/or reflective surface 119 of the vehicle mirror assembly 109 can be selectively controlled, the controller 127 can also generate a second control signal to activate a transparency of at least a portion of the housing 117 and/or reflective surface 119 to enable signals measured or emitted by the movable sensor 101 to pass through (optional step 905). The second control signal, for instance, can be used to selectively make the housing 117 and/or reflective surface 119 transparent in coordination with the first control signal to move/orient the movable 105 or in coordination with the activation of the movable 105 to begin capturing sensor data. In some embodiments, the housing 117 and/or reflective surface 119 can be made transparent as in their entirety (e.g., as a single unit). In alternate embodiments, the selected portions of the housing 117 and/or reflective surface 119 can be selectively made transparent. For example, the second control signal may include or target a specific x-y position or elements on a grid to make transparent as described with respect to the various embodiments of FIG. 2 above.

In one embodiment, the first control signal and/or second control signal can be determined based on any one or more of the following:

Based on a location of the vehicle 107—e.g., can be used to determine or anticipate viewing or sensor coverage needs (e.g., requested target of the diagnostic scan). Then depending on the anticipated viewing or sensor coverage, one or more portions of the housing 117 and/or reflective surface 119 can be made transparent so that the sensor field of view is not obstructed by the housing 117 and/or reflective surface 119.

Based on a location of one or more objects of interest to the diagnostic scan—e.g., an object such as tire 103, body panel, etc. might not be in a current line of sight of the movable sensor 101, and therefore would require a sensor movement or orientation adjustment. In some cases, the position and movement of the object(s) can be tracked/anticipated using the movable sensor 101 to avoid loss of visibility. Then, in embodiments supporting selective transparency, one or more portions of the housing 117 and/or reflective surface 119 can be made transparent so that the sensor field of view is not obstructed by the housing 117 and/or reflective surface 119.

Based on navigation information—e.g., an activation or movement of the movable sensor 101 to perform a diagnostic scan can be based on the status of the navigation route entered or performed for a vehicle. For example, the diagnostic scan can be triggered on based the start, end, or progress during a navigation route. In other words, the need for a diagnostic scan may be determined once a route has been entered into or calculated by a navigation system. A movement of the sensor 101 would then be activated upon starting or reaching a specific location on the navigation route. This may include analyzing the route and determining locations where diagnostic scans are to be performed (e.g., areas of the route where the vehicle 107 is likely to encounter conditions that may damage the vehicle 107, tires 103, and/or body 105). In embodiments supporting selective transparency, the controller 127 can coordinate the movements of the movable sensor 101 with a sequence of transparency activations of the housing 117 and/or reflective surface 119. In this way, the controller 127 can also (pre)determine a sequence of transparency activations of the housing 117 and/or reflective surface 119 in coordination with sensor movements associated with a navigation route. In some embodiments, a navigation route may be modified enroute based on, for instance, updated traffic, weather, construction, destination change, etc. In such cases, the timing or location of the diagnostic scan may also be modified.

Based on map information (e.g., POIs, traffic, road attributes, time of day, weather etc.) and traffic—e.g., different locations, different traffic conditions, or different times of day may trigger diagnostic scans according to the various embodiments described herein. In one embodiment, the map information may also keep a record of locations where accidents or other abnormal events have occurred before and allow trigger diagnostic scans of the vehicle 107 at those locations. Examples of other abnormal events include but are not limited to locations of previously observed debris, construction, potholes, pedestrian crossing, etc. In other words, the controller determines a proximity of the vehicle 107 to a geographic area of interest, geotagged events, and/or other map features. The control signal is then generated to modify the orientation, the position, or a combination thereof and to direct a field of view of the movable sensor to perform a diagnostic scan based on the geographic area of interest, geotagged events, map features, etc.

Based on an orientation of a reflective surface 119 (e.g., a mirror) of a vehicle mirror assembly 109—e.g., sensor movement may be locked to or made to diverge from the reflective surface 119's position or movement as it performs a diagnostic scan.

In step 907, the controller 127 provides the first control signal (e.g., for controlling sensor movement) to an actuator assembly 125 of the vehicle mirror assembly 109. The actuator assembly configured to modify the orientation, the position, or a combination thereof of a movable sensor based on the control signal. In one embodiment, the control signal may specify a direction, field of view, angle, etc. to move or orient the movable sensor 101 along with signals to alter the opacity/transparency of the housing 117 and/or reflective surface 119 of the vehicle mirror assembly 109 that blocks or otherwise interferes with the movable sensor 101's being able to emit or measure signals from the specified direction, field of view, angle, etc.

In embodiments that support selective transparency, the controller 127 provides the second control signal (e.g., for transparency activation) to a transparency control element 133 (or equivalent component) of the vehicle mirror assembly 109. As described in the embodiments above, the second control signal can specify all or a portion housing 117 and/or reflective surface 119 to make transparent to the signals emitted or measured by the movable sensor 101. The second control signal, for instance, can specify the target x-y position or elements on a grid corresponding to the portion of the housing 117 and/or reflective surface 119 to make transparent. The transparency control element 133 can then cause an application of voltage, heat, light, etc. to be applied to the specified portion of the housing 117 and/or reflective surface 119 to activate transparency (optional step 909).

Returning to FIG. 1, in one embodiment, the diagnostic platform 135, controller 127, and/or mapping platform 147 have connectivity over the communication network 145 to the services platform 151 that provides one or more services 153. By way of example, the services 153 may be third-party services and include mapping services, navigation services, travel planning services, notification services, social networking services, content (e.g., audio, video, images, etc.)

provisioning services, application services, storage services, contextual information determination services, location-based services, information-based services (e.g., weather, traffic, news, etc.), etc. In one embodiment, the services platform 151 uses the output of the diagnostic platform 135 generated from sensor data (e.g., diagnostic data 137) collected by one or more movable sensors 101 of the vehicle mirror assembly 109 to provide services such as navigation, mapping, other location-based services, etc.

In one embodiment, the services platform 151 and/or mapping platform 147 may be a platform with multiple interconnected components and may include multiple servers, intelligent networking devices, computing devices, components, and corresponding software for providing a runaway vehicle detection system. In addition, it is noted that the services platform 151 and/or mapping platform 147 may be a separate entity of the system 100 or included within the local components of the vehicle 107 or controller 127.

In one embodiment, content providers 155 may provide content or data (e.g., including geographic data, sensor data, etc.) to the geographic database 149, the mapping platform 147, the services platform 151, the services 153, and/or the controller 127. The content provided may be any type of content, such as sensor data, map content, textual content, audio content, video content, image content, etc. In one embodiment, the content providers 155 may provide content that may aid in controlling the movement/orientation of the movable sensor 101 and/or using the sensor data collected by the movable sensor 101. In one embodiment, the content providers 155 may also store content associated with the geographic database 149, mapping platform 147, services platform 151, services 153, and/or controller 127. In another embodiment, the content providers 155 may manage access to a central repository of data, and offer a consistent, standard interface to data, such as a repository of the geographic database 149.

By way of example, the controller 127 can be any type of embedded system, processor, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. In one embodiment, the controller 127 may be associated with the vehicle mirror assembly 109 or vehicle 107 or be a component part of the vehicle mirror assembly 109 or vehicle 107.

In one embodiment, the vehicle mirror assembly 109 are configured with various movable sensors 101 for generating or collecting sensor data, related geographic/map data, etc. In one embodiment, the sensed data represent sensor data associated with a geographic location or coordinates at which the sensor data was collected. By way of example, the sensors may include a camera/image sensor, proximity sensors, a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, an audio recorder for gathering audio data, velocity sensors, and the like.

Other examples of movable sensors 101 of the vehicle mirror assembly 109 may include light sensors, orientation sensors augmented with height sensors and acceleration sensors (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, the movable sensors 101 may detect the relative distance of the vehicle from a physical divider, a lane or roadway, the presence of other vehicles, pedestrians, traffic lights, potholes and any other objects, or a combination thereof. In one scenario, the sensors 101 may detect weather data, traffic information, or a combination thereof. In one embodiment, the vehicle 107 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the vehicle can include equivalent sensors that are not movable and can be used in combination with the movable sensors 101 to determine risk and/or determine an optimal orientation or movement of the mobile sensors 101 according to various embodiments described herein.

In one embodiment, the communication network 145 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), 5G New Radio, Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the diagnostic platform 135, controller 127, mapping platform 147, services platform 151, services 153, vehicle 107, and/or content providers 155 communicate with each other and other components of the system 100 using well known, new or still developing protocols. In this context, a protocol includes a set of rules defining how the network nodes within the communication network 145 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a datalink (layer 2) header, an internetwork (layer 3) header and a transport (layer 4) header, and various application (layer 5, layer 6 and layer 7) headers as defined by the OSI Reference Model.

Figure 10:
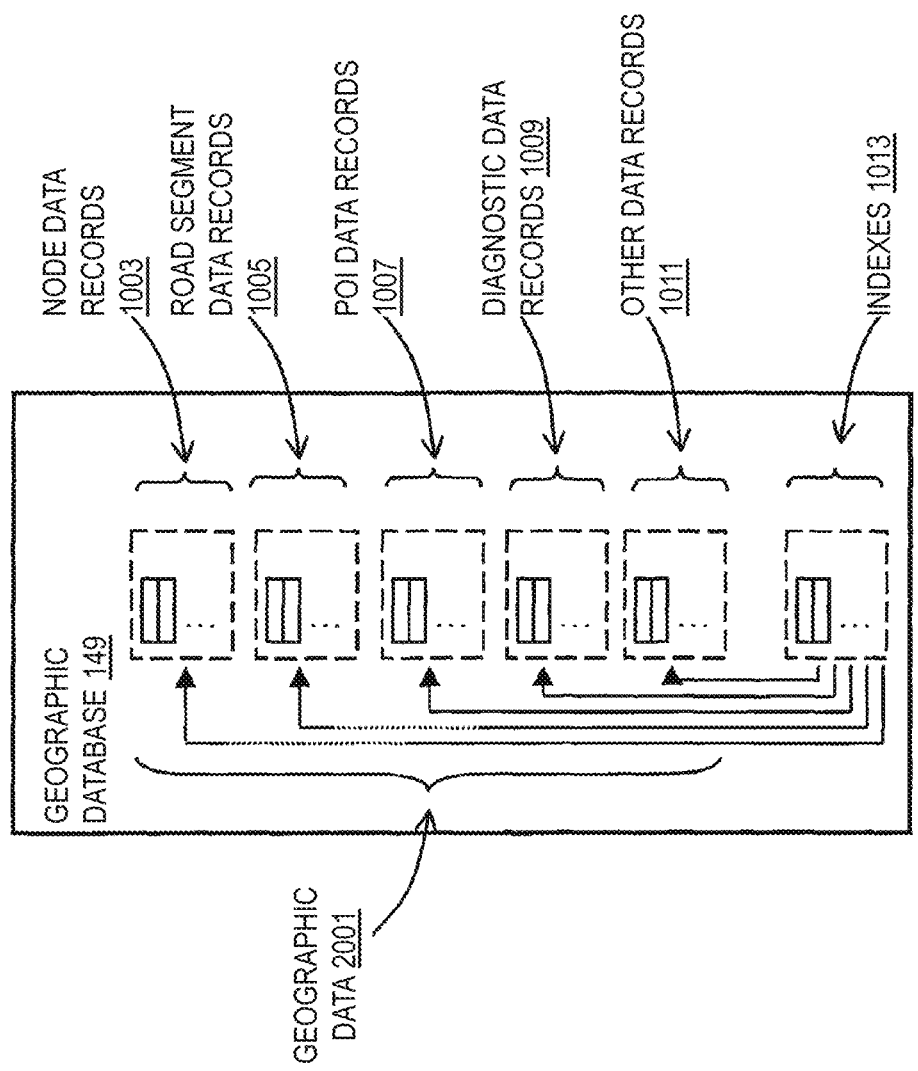
FIG. 10 is a diagram of a geographic database, according to one embodiment.

FIG. 10 is a diagram of a geographic database, according to one embodiment. In one embodiment, the geographic database 149 includes geographic data 1001 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 149.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 149 follows certain conventions. For example, links do not cross themselves and do not cross each other except at a node. Also, there are no duplicated shape points, nodes, or links. Two links that connect each other have a common node. In the geographic database 149, overlapping geographic features are represented by overlapping polygons. When polygons overlap, the boundary of one polygon crosses the boundary of the other polygon. In the geographic database 149, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 149 includes node data records 1003, road segment or link data records 1005, POI data records 1007, diagnostic data records 1009, other records 1011, and indexes 1013, for example. More, fewer, or different data records can be provided. In one embodiment, additional data records (not shown) can include cartographic ("carto") data records, routing data, and maneuver data. In one embodiment, the indexes 1013 may improve the speed of data retrieval operations in the geographic database 149. In one embodiment, the indexes 1013 may be used to quickly locate data without having to search every row in the geographic database 149 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points corresponding to the respective links or segments of the road segment data records 1005. The road link data records 1005 and the node data records 1003 represent a road network, such as used by vehicles, cars, and/or other entities. Alternatively, the geographic database 149 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, other road adjacent objects/features, etc. In one embodiment, the stored attributes or data can include two-dimensional and/or three-dimensional representations of object geometries corresponding to road adjacent object, buildings, features, etc. These object representations and their location data can be used by the system 100 to control one or more vehicle mirror assemblies 109 to keep the objects within the field of view of their respective movable sensors 101. For example, the stored object representations and locations can be used to compute a line of sight between the sensors 101 of the vehicle mirror assemblies 109 and the different objects (e.g., to determine sensor movements and/or transparency activations according to the various embodiments described herein). The geographic database 149 can include data about the POIs and their respective locations in the POI data records 1007. The geographic database 149 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city). In one embodiment, the geographic database 149 can also store the locations where incidents, accidents, and/or any other events that the system 100 can monitor and direct sensor movements and/or transparency activations towards.

In one embodiment, the geographic database 149 can also include diagnostic data records 1009 for storing the data used for performing diagnostic scans, performing orientation/movement of the movable sensors 101, sensor data collected from the sensor data, risk assessment data resulting from the analysis of the sensor data, optimal orientation or sequences of orientations determine for a given road or map feature, and/or any other data used or generated by the diagnostic platform 135, controller 127, mapping platform 147, services platform 151, services 153, and/or content provider 155 according to the various embodiments described herein. In one embodiment, the diagnostic data records 1009 (e.g., data indicating an optimal movement or orientation of a movable sensor 101) can be associated with one or more of the node records 1503, road segment records 1005, and/or POI data records 1007; or portions thereof (e.g., smaller or different segments than indicated in the road segment records 1005, individual lanes of the road segments, etc.) to provide recommend orientations or fields of views for the movable sensor 101 at a given location.

In one embodiment, the geographic database 149 can be maintained by the content provider 155 in association with the mapping platform 147 (e.g., a map developer). The map developer can collect geographic data to generate and enhance the geographic database 149. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., runaway vehicle events, runaway vehicle safety locations, etc.) and/or record information about them, for example. Also, remote sensing, such as aerial or satellite photography, can be used.

In one embodiment, the geographic database 149 include high resolution or high definition (HD) mapping data that provide centimeter-level or better accuracy of map features. For example, the geographic database 149 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. In one embodiment, the HD mapping data can also include locations and two-dimensional and/or three-dimensional representations of objects that can be monitored by the movable sensors 101 of the vehicle mirror assemblies 109. As discussed above, the locations and representation enable the system 100 to compute line-of-sight data between sensors 101/vehicle mirror assemblies 109/vehicles 107 and the objects/map features of interest to control sensor movement and/or transparency activations of the housing 117 and/or reflective surface 119. By way of example, the HD mapping data also enable highly automated vehicles to precisely localize themselves on the road, and to determine road attributes (e.g., learned speed limit values) to at high accuracy levels.

In one embodiment, the geographic database 149 is stored as a hierarchical or multilevel tile-based projection or structure. More specifically, in one embodiment, the geographic database 149 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 149 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 107, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing vehicle diagnostics using a vehicle mirror assembly 109 with a movable sensor 101 may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

Figure 11:
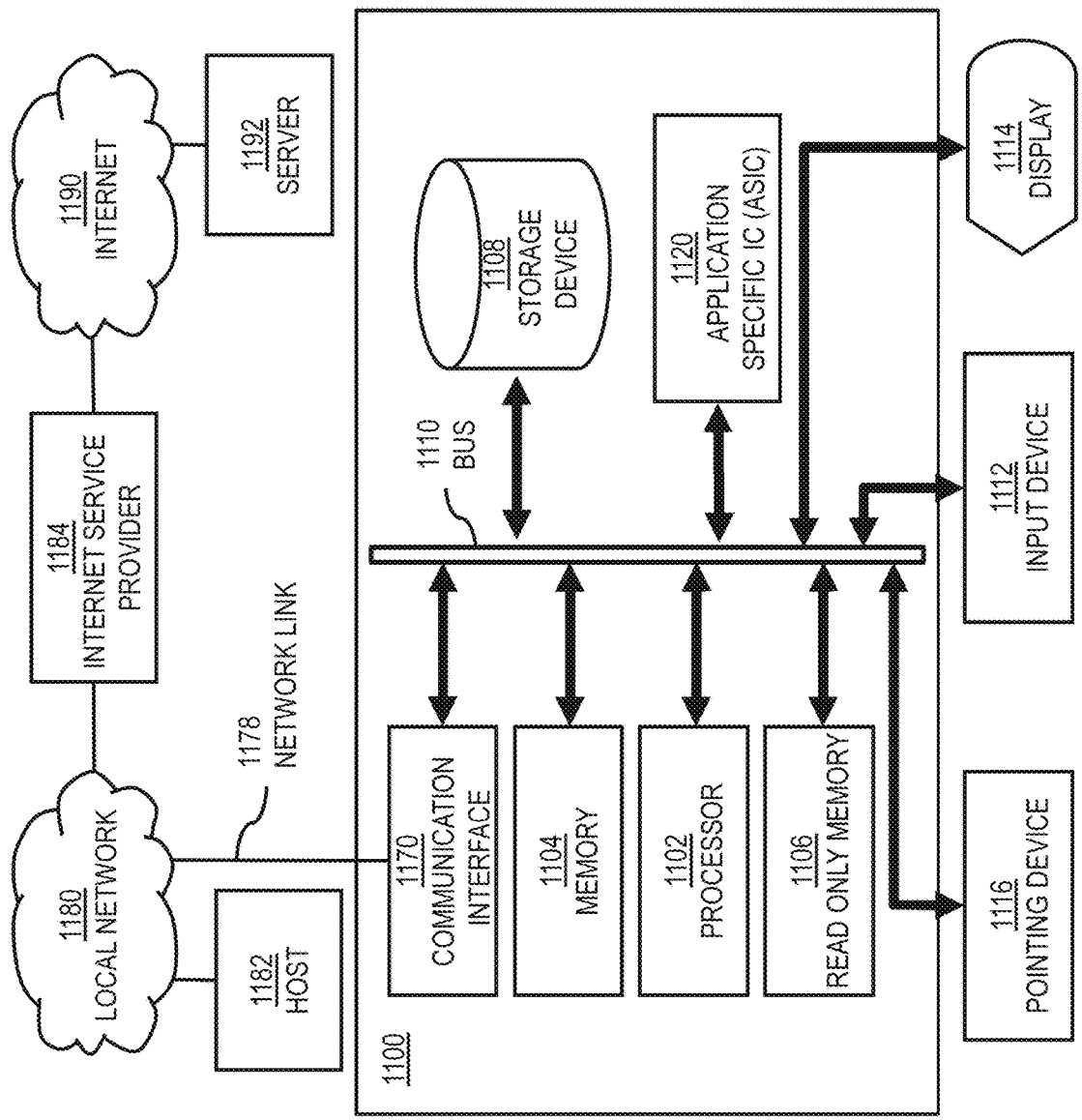
FIG. 11 is a diagram of hardware that can be used to implement an embodiment.

FIG. 11 illustrates a computer system 1100 upon which an embodiment of the invention may be implemented. Computer system 1100 is programmed (e.g., via computer program code or instructions) to provide vehicle diagnostic functions associated with a vehicle mirror assembly 109 with a movable sensor 101 as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing vehicle diagnostic functions associated with a vehicle mirror assembly 109 with a movable sensor 101. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for providing vehicle diagnostics using a vehicle mirror assembly 109 with a movable sensor 101. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk, or flash card, for storing information, including instructions, that persists even when the computer system 1100 is turned off or otherwise loses power.

Information, including instructions for providing vehicle diagnostics using a vehicle mirror assembly 109 with a movable sensor 101, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners, and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic, or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 145 for providing vehicle diagnostic functions associated with a vehicle mirror assembly 109 with a movable sensor 101.

The term computer-readable medium is used herein to refer to any medium that participates in providing information to processor 1102, including instructions for execution. Such a medium may take many forms, including, but not limited to, non-volatile media, volatile media, and transmission media. Non-volatile media include, for example, optical or magnetic disks, such as storage device 1108. Volatile media include, for example, dynamic memory 1104.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which an embodiment of the invention may be implemented. Chip set 1200 is programmed to provide vehicle diagnostic functions associated with a vehicle mirror assembly 109 with a movable sensor 101 as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide vehicle diagnostic functions associated with a vehicle mirror assembly 109 with a movable sensor 101. The memory 1205 also stores the data associated with or generated by the execution of the inventive steps.

Figure 13:
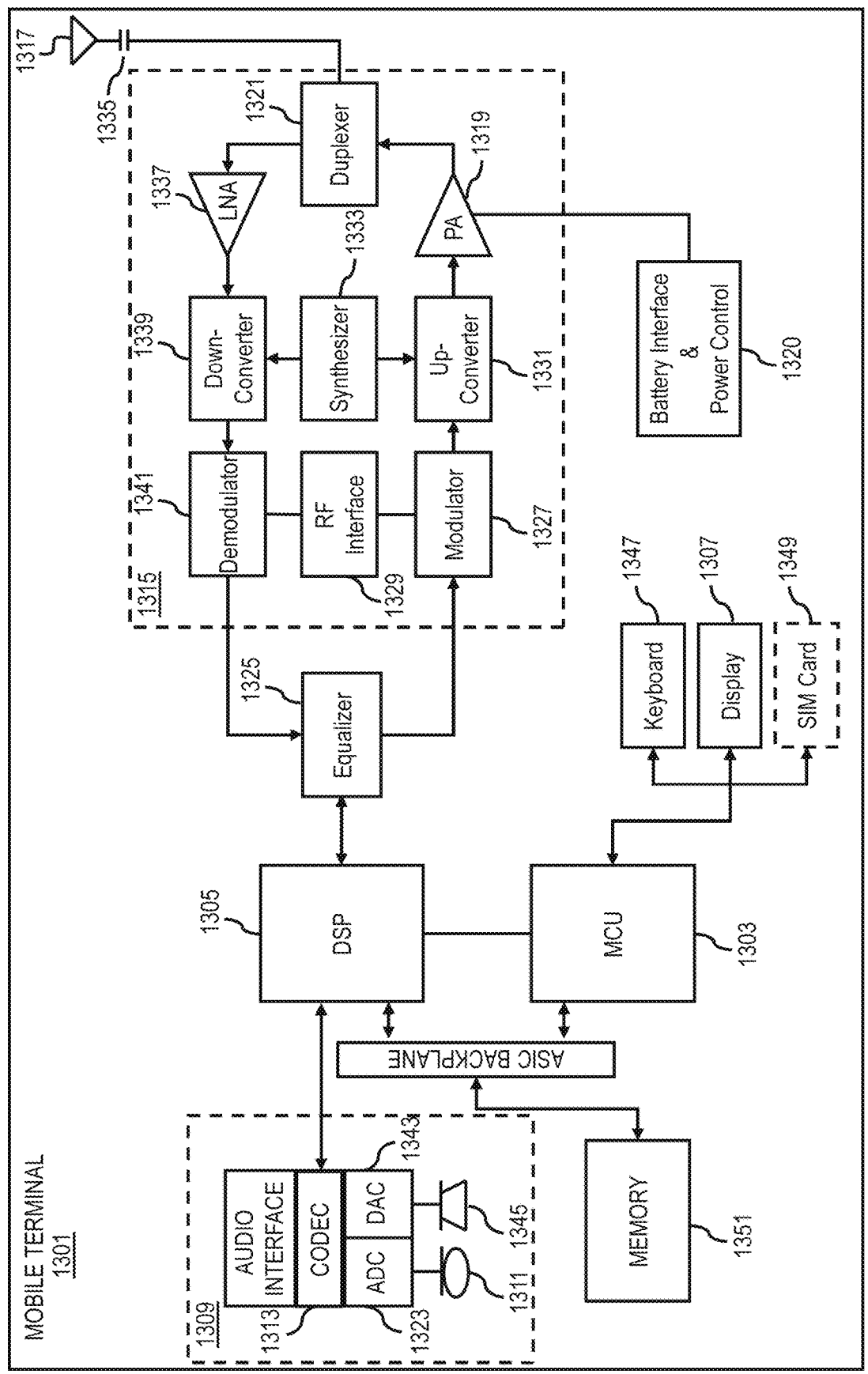
FIG. 13 is a diagram of a mobile terminal (e.g., handset or vehicle or part thereof) that can be used to implement an embodiment.

FIG. 13 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to provide vehicle diagnostic functions associated with a vehicle mirror assembly 109 with a movable sensor 101. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving an indication identifying a need for a diagnostic scan;
   executing the diagnostic scan by initiating a movement of a movable sensor of a vehicle mirror assembly attached to a vehicle and acquiring diagnostic data during the movement of the movable sensor by repositioning the movable sensor from inside the vehicle mirror assembly to outside the vehicle mirror assembly through a portal of the vehicle mirror assembly;
   analyzing the diagnostic data to generate a diagnostic report; and
   providing the diagnostic report as an output.

2. The method of claim 1, wherein the indication comprises at least one of:
   a fuel consumption of the vehicle;
   an activation of an alarm of the vehicle;
   an impact or a vibration of the vehicle;
   a location of the vehicle;
   an object detected within a proximity threshold of the vehicle;
   a navigation route of the vehicle;
   a contextual parameter; or
   a schedule.

3. The method of claim 1, wherein the movement includes at least one of:
   a sweep of the movable sensor in a controlled pattern;
   a deployment of the movable sensor away from the vehicle; or
   a change in a feature or mode of operation of the movable sensor.

4. The method of claim 1, further comprising performing at least one of:
   activating or operating a function on the vehicle during the diagnostic data; or
   providing directions or feedback for operating the vehicle during the diagnostic scan.

5. The method of claim 1, wherein the analyzing of the diagnostic data comprises processing the diagnostic data to determine a wheel or tire condition, a vehicle body condition, or a combination thereof; and wherein the diagnostic report relates to the wheel or tire condition, the vehicle body condition, or a combination thereof.

6. The method of claim 1, wherein the analyzing of the diagnostic data comprises applying a machine vision or a machine learning algorithm on the diagnostic data to detect a vehicle condition.

7. The method of claim 1, wherein the analyzing of the diagnostic data comprises using historical or reference data to identify a change in a vehicle condition based on the diagnostic data.

8. The method of claim 1, further comprising:
   predicting a risk to the vehicle based on the diagnostic scan.

9. The method of claim 1, further comprising:
   initiating a subsequent diagnostic scan at a subsequent time from the diagnostic scan; and
   predicting a vehicle problem based on the diagnostic scan and the subsequent diagnostic scan.

10. The method of claim 1, further comprising:
    querying for contextual information associated with the vehicle, an environment of the vehicle, map information associated with a location of the vehicle, or a combination thereof,
    wherein the analyzing of the diagnostic data is further based on the contextual information.

11. The method of claim 1, wherein the diagnostic report includes at least one of:
    a representation of a vehicle condition, a wheel or tire condition, or a combination thereof determined based on the diagnostic scan;
    a recommendation for addressing the vehicle condition, the wheel or tire condition, or a combination thereof;
    an executable instruction based on the vehicle condition, the wheel or tire condition, or a combination thereof; or
    an alert indicating the vehicle condition, the wheel or tire condition, or a combination thereof.

12. The method of claim 1, wherein the diagnostic data includes image data, optical data, sound data, infrared data, LiDAR data, or a combination thereof.

13. The method of claim 1, wherein the vehicle mirror assembly comprises:
    a housing attachable to the vehicle;
    a reflective surface coupled to the housing covering an opening of the housing;
    the movable sensor coupled to the housing or contained in a space formed by the housing the reflective surface; and
    an actuator assembly configured to modify an orientation, a position, or a combination thereof of the movable sensor in response to a control signal.

14. A system comprising:
    one or more movable sensors of a vehicle;
    a controller for directing a movement of the one or more movable sensors; and
    at least one processor configured to:
    receive an indication identifying a need for a diagnostic scan;
    execute the diagnostic scan by initiating the movement of the one or more movable sensors and acquiring diagnostic data during the movement of the one or more movable sensors, wherein the movement of the one or more movable sensors includes repositioning at least one of the one or more movable sensors from inside the vehicle mirror assembly to outside the vehicle mirror assembly through a portal of the vehicle mirror assembly; and analyzing the diagnostic data to generate a diagnostic report.

15. The system of claim 14, wherein the indication comprises at least one of:
a fuel consumption of the vehicle;
an activation of an alarm of the vehicle;
an impact or a vibration of the vehicle;
a location of the vehicle;
an object detected within a proximity threshold of the vehicle;
a navigation route of the vehicle;
a contextual parameter; or
a schedule.

16. The system of claim 14, wherein the movement includes at least one of:
a sweep of the one or more movable sensors in a controlled pattern;
a deployment of the one or more movable sensors away from the vehicle; or
a change in a feature or mode of operation of the movable sensor.

17. The system of claim 14, wherein the controller is further configured to perform at least one of:
activating or operating a function on the vehicle during the diagnostic data; or
providing directions or feedback for operating the vehicle during the diagnostic scan.

18. A non-transitory computer-readable storage medium carrying one or more sequences of one or more instructions which, when executed by one or more processors, cause an apparatus to perform:
receiving an indication identifying a need for a diagnostic scan;
executing the diagnostic scan by initiating a movement of a movable sensor of a vehicle mirror assembly attached to a vehicle and acquiring diagnostic data during the movement of the movable sensor, wherein the movement of the movable sensor repositions the movable sensor from inside the vehicle mirror assembly to outside the vehicle mirror assembly through a portal of the vehicle mirror assembly;
analyzing the diagnostic data to generate a diagnostic report; and
providing the diagnostic report as an output.

19. The non-transitory computer-readable storage medium of claim 18, wherein the indication comprises at least one of:
a fuel consumption of the vehicle;
an activation of an alarm of the vehicle;
an impact or a vibration of the vehicle;
a location of the vehicle;
an object detected within a proximity threshold of the vehicle;
a navigation route of the vehicle;
a contextual parameter; or
a schedule.

20. The non-transitory computer-readable storage medium of claim 18, wherein the movement includes at least one of:
a sweep of the movable sensor in a controlled pattern;
a deployment of the movable sensor away from the vehicle; or
a change in a feature or mode of operation of the movable sensor.

* * * * *